United States Patent
Nam et al.

(10) Patent No.: US 9,474,061 B2
(45) Date of Patent: Oct. 18, 2016

(54) UPLINK HYBRID ACKNOWLEDGEMENT SIGNALING IN WIRELESS COMMUNICATIONS SYSTEMS

(71) Applicant: Samsung Electronics Co., Ltd., Suwon-si, Gyeonggi-do (KR)

(72) Inventors: Young-Han Nam, Richardson, TX (US); Jin-Kyu Han, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/734,876

(22) Filed: Jun. 9, 2015

(65) Prior Publication Data

US 2015/0296491 A1 Oct. 15, 2015

Related U.S. Application Data

(63) Continuation of application No. 13/931,113, filed on Jun. 28, 2013, now Pat. No. 9,055,569.

(Continued)

(51) Int. Cl.
*H04W 4/00* (2009.01)
*H04W 72/04* (2009.01)
(Continued)

(52) U.S. Cl.
CPC .......... *H04W 72/042* (2013.01); *H04L 1/0061* (2013.01); *H04L 1/1812* (2013.01);
(Continued)

(58) Field of Classification Search
CPC ............................ H04W 72/04; H04W 88/08
See application file for complete search history.

(56) References Cited

U.S. PATENT DOCUMENTS

| 2011/0045860 A1 | 2/2011 | Nam et al. |
| 2011/0292900 A1* | 12/2011 | Ahn ............ H04L 1/1607 370/329 |
| 2012/0039275 A1 | 2/2012 | Chen et al. |

FOREIGN PATENT DOCUMENTS

| WO | WO 2011/083068 A1 | 7/2011 |
| WO | WO 2012/023741 A2 | 2/2012 |

OTHER PUBLICATIONS

Extended European Search Report dated Mar. 9, 2016 in connection with European Application No. 13808447.0, 10 pages.

(Continued)

*Primary Examiner* — Afshawn Towfighi

(57) ABSTRACT

A mobile station is capable of exchanging control information in a communication system. A mobile station transceiver receives downlink control information on an Enhanced Physical Downlink Control Channel (EPDCCH) comprising a Enhanced Control Channel Elements (ECCE). A mobile station controller identifies a first resource for uplink control information based on the first ECCE of the at least one ECCE, a resource offset configured for the EPDCCH, and ACK/NACK resource offset on the EPDCCH, when the EPDCCH is distributed transmission, and also identifies a second resource for uplink control information based on the first ECCE of the at least one ECCE, a resource offset configured for the EPDCCH, ACK/NACK resource offset on the EPDCCH and C-RNTI, if the EPDCCH is localized transmission. The transceiver also transmits the uplink control information on the first resource or the second resource according to whether the EPDCCH is distributed transmission or localized transmission.

20 Claims, 8 Drawing Sheets

Related U.S. Application Data

(60) Provisional application No. 61/666,582, filed on Jun. 29, 2012, provisional application No. 61/678,967, filed on Aug. 2, 2012, provisional application No. 61/721,356, filed on Nov. 1, 2012.

(51) Int. Cl.
*H04L 1/00* (2006.01)
*H04L 1/18* (2006.01)
*H04L 5/00* (2006.01)

(52) U.S. Cl.
CPC .......... *H04L1/1861* (2013.01); *H04L 5/0037* (2013.01); *H04L 5/0055* (2013.01); *H04W 72/0406* (2013.01); *H04L 5/0023* (2013.01); *H04L 5/0035* (2013.01)

(56) References Cited

OTHER PUBLICATIONS

Samsung, "HARQ-ACK PUCCH Resources in Response to ePDCCH Detections", 3GPP TSG RAN WG1 #89, R1-122259, May 21-25, 2012, Prague, Czech Republic, 2 pages.
Samsung, "HARQ-ACK Transmission in Response to E-PDCCH Detection", 3GPP TSG RAN WG1 #68, R1-120193, Feb. 6-10, 2012, Dresden, Germany, 3 pages.
International Search Report dated Oct. 24, 2013 in connection with International Patent Application No. PCT/KR2013/048964, 6 pages.
Written Opinion of International Searching Authority dated Oct. 24, 2013 in connection with International Patent Application No. PCT/KR2013/048964, 5 pages.

* cited by examiner

FIG. 1
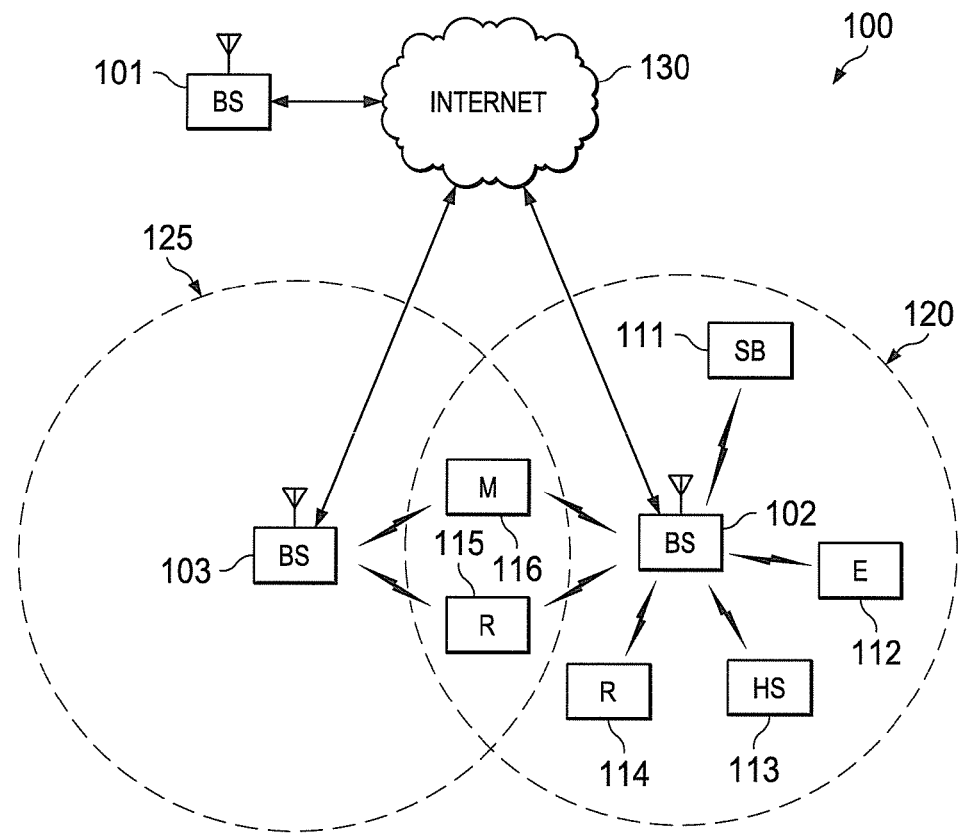
FIG. 2
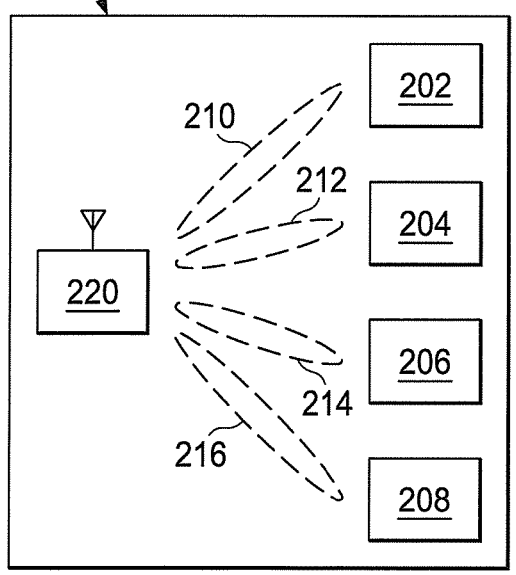
FIG. 13
| eCCE1 | 1 | 9 | 13 | 15 |
|---|---|---|---|---|
| eCCE2 | 2 | | | |
| eCCE3 | 3 | 10 | | |
| eCCE4 | 4 | | | |
| eCCE5 | 5 | 11 | 14 | |
| eCCE6 | 6 | | | |
| eCCE7 | 7 | 12 | | |
| eCCE8 | 8 | | | |

UPLINK HYBRID ACKNOWLEDGEMENT SIGNALING IN WIRELESS COMMUNICATIONS SYSTEMS

CROSS-REFERENCE TO RELATED APPLICATION(S) AND CLAIM OF PRIORITY

This application is a continuation of U.S. patent application Ser. No. 13/931,113 filed Jun. 28, 2013, which claims priority to U.S. Provisional Patent Application Ser. No. 61/666,582, filed Jun. 29, 2012, entitled "UPLINK HYBRID ACKNOWLEDGEMENT SIGNALING IN WIRELESS COMMUNICATIONS SYSTEMS", U.S. Provisional Patent Application Ser. No. 61/678,967, filed Aug. 2, 2012, entitled "UPLINK HYBRID ACKNOWLEDGEMENT SIGNALING IN WIRELESS COMMUNICATIONS SYSTEMS" and U.S. Provisional Patent Application Ser. No. 61/721,356, filed Nov. 1, 2012, entitled "UPLINK HYBRID ACKNOWLEDGEMENT SIGNALING IN WIRELESS COMMUNICATIONS SYSTEMS". The content of the above-identified patent documents is incorporated herein by reference.

TECHNICAL FIELD

The present application relates generally to wireless networks, and more specifically to a wireless network and method determining at least part of a PUCCH resource index.

BACKGROUND

The following documents and standards descriptions are hereby incorporated into the present disclosure as if fully set forth herein:

REF1—3GPP TS 36.211 v10.1.0, "E-UTRA, Physical channels and modulation."

REF2—3GPP TS 36.212 v10.1.0, "E-UTRA, Multiplexing and Channel coding."

REF3—3GPP TS 36.213 v10.1.0, "E-UTRA, Physical Layer Procedure."

In 3GPP Long Term Evolution (LTE) (3GPP LTE Rel-10), the physical uplink control channel, PUCCH, carries uplink control information. Simultaneous transmission of PUCCH and PUSCH from the same UE is supported if enabled by higher layers. For frame structure type 2, the PUCCH is not transmitted in the UpPTS field.

SUMMARY

A method and system for use in a wireless network determining at least part of a PUCCH resource index $n_{PUCCH}^{(1)}$ (PUCCH format 1a/1b), wherein:

a subscriber station receives a DL assignment from at least one base station;

the subscriber station determines a PUCCH resource index $n_{PUCCH}$ (PUCCH format 1a/1b), wherein:

when PDCCH comprising a number of CCEs carries the DL assignment, the subscriber station derives the PUCCH resource index $n_{PUCCH}$ according to the equation:

$$n_{PUCCH} = n_{CCE} + N;$$

wherein $n_{CCE}$ is the smallest CCE index of the number of CCEs, $N = N_{PUCCH}^{(1)}$ is cell-specifically higher-layer configured;

when ePDCCH comprising a number of eCCEs carries the DL assignment:

when the ePDCCH is localized, the subscriber station derives the PUCCH resource index $n_{PUCCH}$ according to the equation:

$$n_{PUCCH} = n_{eCCE} + N' + Y + \Delta; \text{ and}$$

when the ePDCCH is distributed, the subscriber station derives the PUCCH resource index $n_{PUCCH}$ according to the equation:

$$n_{PUCCH} = n_{eCCE} + N' + Y;$$

wherein $n_{eCCE}$ is the smallest eCCE index of the number of eCCEs, $N' = N_{PUCCH\text{-}UE\text{-}ePDCCH}^{(1)}$ is subscriber station-specifically higher-layer configured, $\Delta$ is a function of RNTI, and Y is determined by a 2-bit field in the DL assignment; and transmitting HARQ-ACK information for a PDSCH scheduled by the DL assignment to the at least one base station on PUCCH resource $n_{PUCCH}$.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates a wireless network that determines at least part of a PUCCH resource index $n_{PUCCH}^{(1)}$ (PUCCH format 1a/1b) according to the principles of the present disclosure;

FIG. 2 illustrates a diagram of a base station in communication with a plurality of mobile stations;

FIG. 13 illustrates exemplary allocation of PDCCH candidates to CCEs for respective ALs.

DETAILED DESCRIPTION

Figure 3:
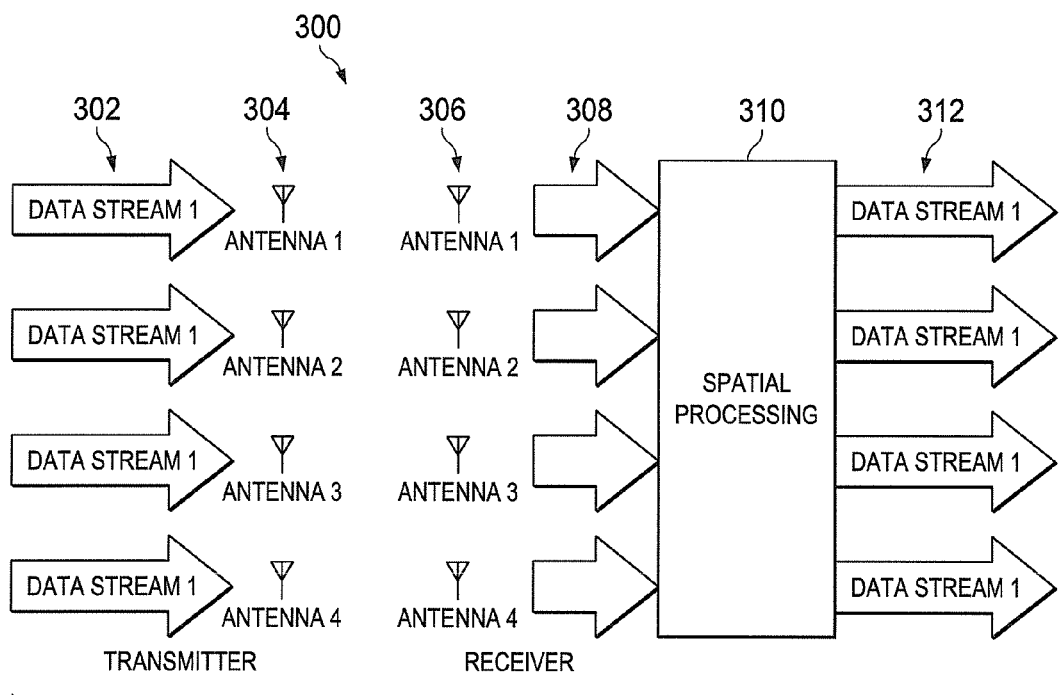
FIG. 3 illustrates a 4×4 multiple-input, multiple-output (MIMO) system.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

FIG. 1 illustrates exemplary wireless network 100, which determines at least part of a PUCCH resource index $n_{PUCCH}^{(1)}$ according to the principles of the present disclosure. In the illustrated embodiment, wireless network 100 includes base station (BS) 101, base station (BS) 102, base station (BS) 103, and other similar base stations (not shown). Base station 101 is in communication with Internet 130 or a similar IP-based network (not shown).

Depending on the network type, other well-known terms may be used instead of "base station," such as "eNodeB" or "access point". For the sake of convenience, the term "base station" shall be used herein to refer to the network infrastructure components that provide wireless access to remote terminals.

Base station 102 provides wireless broadband access to Internet 130 to a first plurality of mobile stations (or user equipment) within coverage area 120 of base station 102. The first plurality of mobile stations includes mobile station 111, which may be located in a small business (SB), mobile station 112, which may be located in an enterprise (E), mobile station 113, which may be located in a WiFi hotspot (HS), mobile station 114, which may be located in a first residence (R), mobile station 115, which may be located in a second residence (R), and mobile station 116, which may be a mobile device (M), such as a cell phone, a wireless laptop, a wireless PDA, or the like.

For sake of convenience, the term "mobile station" is used herein to designate any remote wireless equipment that wirelessly accesses a base station, whether or not the mobile station is a truly mobile device (e.g., cell phone) or is normally considered a stationary device (e.g., desktop personal computer, vending machine, etc.). Other well-known terms may be used instead of "mobile station", such as "subscriber station (SS)", "remote terminal (RT)", "wireless terminal (WT)", "user equipment (UE)", and the like.

Base station 103 provides wireless broadband access to Internet 130 to a second plurality of mobile stations within coverage area 125 of base station 103. The second plurality of mobile stations includes mobile station 115 and mobile station 116. In an exemplary embodiment, base stations 101-103 may communicate with each other and with mobile stations 111-116 using OFDM or OFDMA techniques.

While only six mobile stations are depicted in FIG. 1, it is understood that wireless network 100 may provide wireless broadband access to additional mobile stations. It is noted that mobile station 115 and mobile station 116 are located on the edges of both coverage area 120 and coverage area 125. Mobile station 115 and mobile station 116 each communicate with both base station 102 and base station 103 and may be said to be operating in handoff mode, as known to those of skill in the art.

Exemplary descriptions of closed-loop transmit beamforming schemes based on codebook design can be found in: 1) D. Love, J. Heath, and T. Strohmer, "Grassmannian Beamforming For Multiple-Input, Multiple-Output Wireless Systems," IEEE Transactions on Information Theory, October 2003, and 2) V. Raghavan, A. M. Sayeed, and N. Boston, "Near-Optimal Codebook Constructions For Limited Feedback Beamforming In Correlated MIMO Channels With Few Antennas," IEEE 2006 International Symposium on Information Theory. Both references are hereby incorporated by reference into this disclosure as if fully set forth herein.

Closed-loop, codebook-based, transmit beamforming may be used in a case where a base station forms a transmit antenna beam toward a single user or simultaneously toward multiple users at the same time and at a certain frequency. An exemplary description of such a system may be found in Quentin H. Spencer, Christian B. Peel, A. Lee Swindlehurst, Martin Harrdt, "An Introduction To the Multi-User MIMO Downlink," IEEE Communication Magazine, October 2004, which is hereby incorporated by reference into this disclosure as if fully set forth herein.

A codebook is a set of pre-determined antenna beams that are known to mobile stations. A codebook-based pre-coding MIMO may provide significant spectral efficiency gain in the downlink closed-loop MIMO. In the IEEE 802.16e and 3GPP Long-Term Evolution (LTE) standards, a four transmit (4-TX) antenna limited feedback based closed-loop MIMO configuration is supported. In IEEE 802.16m and 3GPP LTE Advanced (LTE-A) standards, in order to provide peak spectral efficiency, eight transmit (8-TX) antenna configurations are proposed as a prominent precoding closed-loop MIMO downlink system. Exemplary descriptions of such systems may be found in 3GPP Technical Specification No. 36.211, "Evolved Universal Terrestrial Radio Access (E-UTRA): Physical Channel and Modulation", which is hereby incorporated by reference into this disclosure as if fully set forth herein.

To eliminate the need for the phase calibration process in cases where channel sounding signals or common pilot signals (or midamble) are not used for data demodulation purpose, closed-loop transformed, codebook-based transmit beamforming may be utilized. An exemplary description of such a system may be found in IEEE C802.16m-08/1345r2, "Transformation Method For Codebook Based Precoding," November 2008, which is hereby incorporated by reference into this disclosure as if fully set forth herein. The transformed codebook method uses the channel correlation information to enhance the performance of the standard codebook, especially in highly correlated channels, as well as to eliminate the need of phase calibration among multiple transmit antennas. Typically, the channel correlation information is based on second-order statistics and thus changes very slowly, which is similar to long-term channel effects, such as shadowing and path loss. As a result, the feedback overhead and computational complexity associated with using correlation information are very small.

FIG. 2 illustrates a diagram 200 of a base station 220 in communication with a plurality of mobile stations 202, 404, 406, and 408 according to an embodiment of this disclosure. In FIG. 2, base station 220 simultaneously communicates with multiple mobile stations using multiple antenna beams.

Each antenna beam is formed toward an intended mobile station at the same time and using the same frequency. Base station 220 and mobile stations 202, 204, 206 and 208 employ multiple antennas for transmission and reception of radio frequency (RF) signals. In an advantageous embodiment, the RF signals may be Orthogonal Frequency Division Multiplexing (OFDM) signals.

Base station 220 performs simultaneous beamforming through a plurality of transmitters to each mobile station. For instance, base station 220 transmits data to mobile station 202 through a beamformed signal 210, data to mobile station 204 through a beamformed signal 212, data to mobile station 406 through a beamformed signal 214, and data to mobile station 408 through a beamformed signal 216. In some embodiments of the disclosure, base station 220 is capable of simultaneously beamforming to the mobile stations 202, 204, 206 and 208. In some embodiments, each beamformed signal is formed toward its intended mobile station at the same time and the same frequency. For the purpose of clarity, the communication from a base station to a mobile station may also be referred to as "downlink communication" and the communication from a mobile station to a base station may be referred to as "uplink communication".

Base station 220 and mobile stations 202, 204, 206 and 208 employ multiple antennas for transmitting and receiving wireless signals. It is understood that the wireless signals may be RF signals and may use any transmission scheme known to one skilled in the art, including an Orthogonal Frequency Division Multiplexing (OFDM) transmission scheme. Mobile stations 202, 204, 206 and 208 may be any device that is capable receiving wireless signals, such as the mobile stations in FIG. 1.

An OFDM transmission scheme is used to multiplex data in the frequency domain. Modulation symbols are carried on frequency sub-carriers. The quadrature amplitude modulated (QAM) symbols are serial-to-parallel converted and input to an Inverse Fast Fourier Transform (IFFT) processing block. At the output of the IFFT circuit, N time-domain samples are obtained. Here N refers to the size of the IFFT/FFT used by the OFDM system. The signal after IFFT is parallel-to-serial converted and a cyclic prefix (CP) is added to the signal sequence. A CP is added to each OFDM symbol to avoid or mitigate the impact due to multipath fading. The resulting sequence of samples is referred to as an OFDM symbol with a CP. On the receiver side, assuming that perfect time and frequency synchronization are achieved, the receiver first removes the CP, and the signal is serial-to-parallel converted before being input to a Fast Fourier Transform (FFT) processing block. The output of the FFT circuit is parallel-to-serial converted, and the resulting QAM symbols are input to a QAM demodulator.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

Because each OFDM symbol has finite duration in the time domain, the sub-carriers overlap with each other in the frequency domain. However, the orthogonality is maintained at the sampling frequency assuming the transmitter and receiver have perfect frequency synchronization. In the case of frequency offset due to imperfect frequency synchronization or high mobility, the orthogonality of the sub-carriers at sampling frequencies is destroyed, resulting in inter-carrier interference (ICI).

The use of multiple transmit antennas and multiple receive antennas at both a base station and a single mobile station to improve the capacity and reliability of a wireless communication channel is known as a Single-User Multiple-Input, Multiple-Output (SU-MIMO) system. A MIMO system provides linear increase in capacity with K, where K is the minimum of number of transmit (M) and receive antennas (N) (i.e., K=min(M,N)). A MIMO system may be implemented with conventional schemes of spatial multiplexing, transmit/receive beamforming, or transmit/receive diversity.

FIG. 3 illustrates a 4×4 multiple-input, multiple-output (MIMO) system 300 according to an embodiment of the present disclosure. In this example, four different data streams 302 are transmitted separately using four transmit antennas 304. The transmitted signals are received at four receive antennas 306 and interpreted as received signals 308. Some form of spatial signal processing 310 is performed on the received signals 308 in order to recover four data streams 312.

An example of spatial signal processing is Vertical-Bell Laboratories Layered Space-Time (V-BLAST), which uses the successive interference cancellation principle to recover the transmitted data streams. Other variants of MIMO schemes include schemes that perform some kind of space-time coding across the transmit antennas (e.g., Diagonal Bell Laboratories Layered Space-Time (D-BLAST)). In addition, MIMO can be implemented with a transmit-and-receive diversity scheme and a transmit-and-receive beamforming scheme to improve the link reliability or system capacity in wireless communication systems.

MIMO channel estimation consists of estimating the channel gain and phase information for links from each of the transmit antennas to each of the receive antennas. Therefore, the channel response, H, for N×M MIMO system consists of an N×M matrix, as shown below:

$$H = \begin{bmatrix} a_{11} & a_{12} & \ldots & a_{1M} \\ a_{21} & a_{22} & \ldots & a_{2M} \\ \vdots & \vdots & \ldots & \vdots \\ a_{N1} & a_{M2} & \ldots & a_{NM} \end{bmatrix}.$$

The MIMO channel response is represented by H and aNM represents the channel gain from transmit antenna N to receive antenna M. In order to enable the estimations of the elements of the MIMO channel matrix, separate pilots may be transmitted from each of the transmit antennas.

As an extension of single user MIMO (SU-MIMO), multi-user MIMO (MU-MIMO) is a communication scenario in which a base station with multiple transmit antennas can simultaneously communicate with multiple mobile stations through the use of multi-user beamforming schemes, such as Spatial Division Multiple Access (SDMA), to improve the capacity and reliability of a wireless communication channel.

3GPP TS 36.211 [REF1] describes PUCCH as in the following:

The physical uplink control channel, PUCCH, carries uplink control information. Simultaneous transmission of PUCCH and PUSCH from the same UE is supported if enabled by higher layers. For frame structure type 2, the PUCCH is not transmitted in the UpPTS field.

The physical uplink control channel supports multiple formats as shown in Table 1. Formats 2a and 2b are supported for normal cyclic prefix only.

TABLE 1

Supported PUCCH formats.

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

All PUCCH formats use a cell-specific cyclic shift, $n_{cs}^{cell}$ ($n_s$,l), which varies with the symbol number l and the slot number $n_s$ according to:

$$n_{cs}^{cell}(n_s,l) = \sum_{i=0}^{7} c(8N_{symb}^{UL} \cdot n_s + 8l + i) \cdot 2^i$$

where the pseudo-random sequence c(i) is defined by section 7.2 of REF1. The pseudo-random sequence generator is initialized with $c_{init} = N_{ID}^{cell}$ it corresponding to the primary cell at the beginning of each radio frame.

The physical resources used for PUCCH depends on two parameters, $N_{RB}^{(2)}$ and $N_{cs}^{(1)}$, given by higher layers. The variable $N_{RB}^{(2)} \geq 0$ denotes the bandwidth in terms of resource blocks that are available for use by PUCCH formats 2/2a/2b transmission in each slot. The variable $N_{cs}^{(1)}$ denotes the number of cyclic shift used for PUCCH formats 1/1a/1b in a resource block used for a mix of formats 1/1a/1b and 2/2a/2b. The value of $N_{cs}^{(1)}$ an integer multiple of $\Delta_{shift}^{PUCCH}$ within the range of {0, 1, . . . , 7}, where $\Delta_{shift}^{PUCCH}$ is provided by higher layers. No mixed resource block is present if $N_{cs}^{(1)} = 0$. At most, one resource block in each slot supports a mix of formats 1/1a/1b and 2/2a/2b. Resources used for transmission of PUCCH formats 1/1a/1b, 2/2a/2b and 3 are represented by the non-negative indices $n_{PUCCH}^{(1,\tilde{p})}$, $$n_{PUCCH}^{(2,\tilde{p})} < N_{RB}^{(2)} N_{sc}^{RB} + \left\lceil \frac{N_{cs}^{(1)}}{8} \right\rceil \cdot (N_{sc}^{RB} - N_{cs}^{(1)} - 2),$$

and $n_{PUCCH}^{(3,\tilde{p})}$, respectively.

PUCCH Formats 1, 1a and 1b

For PUCCH format 1, information is carried by the presence/absence of transmission of PUCCH from the UE. In the remainder of this section, d(0)=1 shall be assumed for PUCCH format 1.

For PUCCH formats 1a and 1b, one or two explicit bits are transmitted, respectively. The block of bits b(0), . . . , b($M_{bit}$−1) shall be modulated as described in Table 2, resulting in a complex-valued symbol d(0). The modulation schemes for the different PUCCH formats are given by Table 1.

The complex-valued symbol d(0) shall be multiplied with a cyclically shifted length $N_{seq}^{PUCCH}=12$ sequence $r_{u,v}^{(\alpha_{\tilde{p}})}$(n) for each of the P antenna ports used for PUCCH transmission according to:

$$y^{(\tilde{p})}(n) = \frac{1}{\sqrt{P}} d(0) \cdot r_{u,v}^{(\alpha_{\tilde{p}})}(n), n = 0, 1, \ldots, N_{seq}^{PUCCH} - 1$$

where $r_{u,v}^{(\alpha_{\tilde{p}})}$(n) is defined with $M_{sc}^{RS} = N_{seq}^{PUCCH}$. The antenna-port specific cyclic shift $\alpha_{\tilde{p}}$ varies between symbols and slots as defined below.

The block of complex-valued symbols $y^{(\tilde{p})}$(0), . . . , $y^{(\tilde{p})}(N_{seq}^{PUCCH}-1)$ shall be scrambled by S($n_s$) and block-wise spread with the antenna-port specific orthogonal sequence $w_{n_{oc}}^{(\tilde{p})}$(i) according to:

$$z^{(\tilde{p})}(m' \cdot N_{SF}^{PUCCH} \cdot N_{seq}^{PUCCH} + m \cdot N_{seq}^{PUCCH} + n) = S(n_s) \cdot w_{n_{oc}^{(\tilde{p})}}(m) \cdot y^{(\tilde{p})}(n)$$

Where:

$m = 0, \ldots, N_{SF}^{PUCCH} - 1$ $n = 0, \ldots, N_{seq}^{PUCCH} - 1$ $m' = 0, 1$ and $$S(n_s) = \begin{cases} 1 & \text{if } n'_p(n_s) \bmod 2 = 0 \\ e^{j\pi/2} & \text{otherwise} \end{cases}$$

with $N_{SF}^{PUCCH}=4$ for both slots of normal PUCCH formats 1/1a/1b, and $N_{SF}^{PUCCH}=4$ for the first slot and $N_{SF}^{PUCCH}=3$ for the second slot of shortened PUCCH formats 1/1a/1b. The sequence $w_{n_{oc}}^{(\tilde{p})}$(i) is given by Table 3 and Table 4 and $n'_{\tilde{p}}(n_s)$ is defined below.

Resources used for transmission of PUCCH format 1, 1a and 1b are identified by a resource index $n_{PUCCH}^{(1,\tilde{p})}$ from which the orthogonal sequence index $n_{oc}^{(\tilde{p})}(n_s)$ and the cyclic shift $\alpha_{\tilde{p}}(n_s,l)$ are determined according to:

$$n_{oc}^{(\tilde{p})}(n_s) = \begin{cases} \lfloor n'_{\tilde{p}}(n_s) \cdot \Delta_{shift}^{PUCCH} / N' \rfloor & \text{for } normal\,cyclic\,prefix \\ 2 \cdot \lfloor n'_{\tilde{p}}(n_s) \cdot \Delta_{shift}^{PUCCH} / N' \rfloor & \text{for } extended\,cyclic\,prefix \end{cases}$$

$$\alpha_{\tilde{p}}(n_s, l) = 2\pi \cdot n_{cs}^{(\tilde{p})}(n_s, l) / N_{sc}^{RB}$$

$$n_{cs}^{(\tilde{p})}(n_s, l) = \begin{cases} [n_{cs}^{cell}(n_s, l) + (n'_{\tilde{p}}(n_s) \cdot \Delta_{shift}^{PUCCH} + (n_{oc}^{(\tilde{p})}(n_s) \bmod \Delta_{shift}^{PUCCH})) \bmod N'] \bmod N_{sc}^{RB} & \text{for } normal\,cyclic\,prefix \\ [n_{cs}^{cell}(n_s, l) + (n'_{\tilde{p}}(n_s) \cdot \Delta_{shift}^{PUCCH} + n_{oc}^{(\tilde{p})}(n_s)/2) \bmod N'] \bmod N_{sc}^{RB} & \text{for } extended\,cyclic\,prefix \end{cases}$$

where:

$$N' = \begin{cases} N_{cs}^{(1)} & \text{if } n_{PUCCH}^{(1,\tilde{p})} < c \cdot N_{cs}^{(1)} / \Delta_{shift}^{PUCCH} \\ N_{sc}^{RB} & \text{otherwise} \end{cases}$$

$$c = \begin{cases} 3 & \text{normal cyclic prefix} \\ 2 & \text{extended cyclic prefix} \end{cases}$$

The resource indices within the two resource blocks in the two slots of a subframe to which the PUCCH is mapped are given by:

$$n'_p(n_s) = \begin{cases} n_{PUCCH}^{(1,\tilde{p})} & \text{if } n_{PUCCH}^{(1,\tilde{p})} < c \cdot \\ & N_{cs}^{(1)}/\Delta_{shift}^{PUCCH} \\ (n_{PUCCH}^{(1,\tilde{p})} - c \cdot N_{cs}^{(1)}/\Delta_{shift}^{PUCCH}) \bmod (c \cdot N_{sc}^{RB}/\Delta_{shift}^{PUCCH}) & \text{otherwise} \end{cases}$$

for $n_s \bmod 2 = 0$ and by:

$$n'_p(n_s) = \begin{cases} [c(n'_p(n_s-1)+1)]\bmod(cN_{sc}^{RB}/\Delta_{shift}^{PUCCH}+1)-1 & \text{if } n_{PUCCH}^{(1,\tilde{p})} \geq c \cdot \\ & N_{cs}^{(1)}/\Delta_{shift}^{PUCCH} \\ \lfloor h_{\tilde{p}}/c \rfloor + (h_{\tilde{p}}\bmod c)N'/\Delta_{shift}^{PUCCH} & \text{otherwise} \end{cases}$$

for $n_s \bmod 2 = 1$, where $h_{\tilde{p}} = (n'_{\tilde{p}}(n_s-1)+d) \bmod(cN'/\Delta_{shift}^{PUCCH})$, with d=2 for normal CP and d=0 for extended CP.

The parameter deltaPUCCH-Shift $\Delta_{shift}^{PUCCH}$ is provided by higher layers.

TABLE 2

Modulation symbol d(0) for PUCCH formats 1a and 1b.

| PUCCH format | b(0), . . . , b($M_{bit}$ − 1) | d(0) |
| --- | --- | --- |
| 1a | 0 | 1 |
|    | 1 | −1 |
| 1b | 00 | 1 |
|    | 01 | −j |
|    | 10 | j |
|    | 11 | −1 |

TABLE 3

Orthogonal sequences [w(0) . . . w($N_{SF}^{PUCCH}$ − 1)] for $N_{SF}^{PUCCH}$ = 4.

| Sequence index $n_{oc}^{(\tilde{p})}(n_s)$ | Orthogonal sequences [w(0) . . . w($N_{SF}^{PUCCH}$ − 1)] |
| --- | --- |
| 0 | [+1 +1 +1 +1] |
| 1 | [+1 −1 +1 −1] |
| 2 | [+1 −1 −1 +1] |

TABLE 4

Orthogonal sequences [w(0) . . . w($N_{SF}^{PUCCH}$ − 1)] for $N_{SF}^{PUCCH}$ = 3.

| Sequence index $n_{oc}^{(\tilde{p})}(n_s)$ | Orthogonal sequences [w(0) . . . w($N_{SF}^{PUCCH}$ − 1)] |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Mapping to Physical Resources

The block of complex-valued symbols $z^{(\tilde{p})}(i)$ shall be multiplied with the amplitude scaling factor $\beta_{PUCCH}$ in order to conform to the transmit power $P_{PUCCH}$ and mapped in sequence starting with $z^{(\tilde{p})}(0)$ to resource elements. PUCCH uses one resource block in each of the two slots in a subframe. Within the physical resource block used for transmission, the mapping of $z^{(\tilde{p})}(i)$ to resource elements (k,l) on antenna port p and not used for transmission of reference signals shall be in increasing order of first k, then l and finally the slot number, starting with the first slot in the subframe.

The physical resource blocks to be used for transmission of PUCCH in slot $n_s$ are given by:

$$n_{PRB} = \begin{cases} \left\lfloor \frac{m}{2} \right\rfloor & \text{if } (m + n_s \bmod 2) \bmod 2 = 0 \\ N_{RB}^{UL} - 1 - \left\lfloor \frac{m}{2} \right\rfloor & \text{if } (m + n_s \bmod 2) \bmod 2 = 1 \end{cases}$$

where the variable m depends on the PUCCH format. For formats 1, 1a and 1b:

$$m = \begin{cases} N_{RB}^{(2)} & \text{if } n_{PUCCH}^{(1,\tilde{p})} < c \cdot N_{cs}^{(1)}/\Delta_{shift}^{PUCCH} \\ \left\lfloor \dfrac{n_{PUCCH}^{(1,\tilde{p})} - c \cdot N_{cs}^{(1)}/\Delta_{shift}^{PUCCH}}{c \cdot N_{sc}^{RB}/\Delta_{shift}^{PUCCH}} \right\rfloor + N_{RB}^{(2)} + \left\lceil \dfrac{N_{cs}^{(1)}}{8} \right\rceil & \text{otherwise} \end{cases}$$

$$c = \begin{cases} 3 & \text{normal cyclic prefix} \\ 2 & \text{extended cyclic prefix} \end{cases}$$

Figure 4:
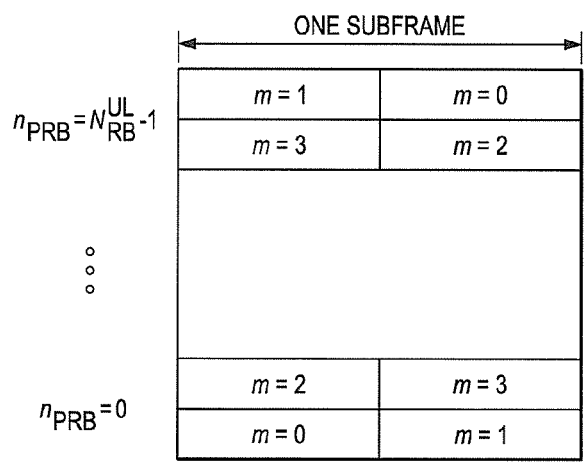
FIG. 4 illustrates mapping of modulation symbols for the physical uplink control channel.

Mapping of modulation symbols for the physical uplink control channel is illustrated in FIG. 4.

In case of simultaneous transmission of sounding reference signal and PUCCH format 1, 1 a, 1b or 3 When there is one serving cell configured, a shortened PUCCH format shall be used where the last SC-FDMA symbol in the second slot of a subframe shall be left empty.

PUCCH Base Sequence Assignment

In RAN1#68bis, the following is agreed on the PUCCH base sequence assignment.

In addition to the existing mechanism, a UE can support the generation of a PUCCH base sequence and a cyclic shift hopping by replacing the physical cell ID NIDcell with a UE-specifically configured parameter X.

FFS if different PUCCH formats share a common X, or have different X values.

FFS on relationship with UE-specific configuration of other RS (e.g., PUSCH DMRS, . . . ).

Companies are encouraged to investigate in mechanisms to provide separate regions for A/Ns associated with different base sequences.

CoMP Scenarios

In 36.819, the following coordinated multipoint (CoMP) transmission/reception scenarios were discussed.

Figure 5:
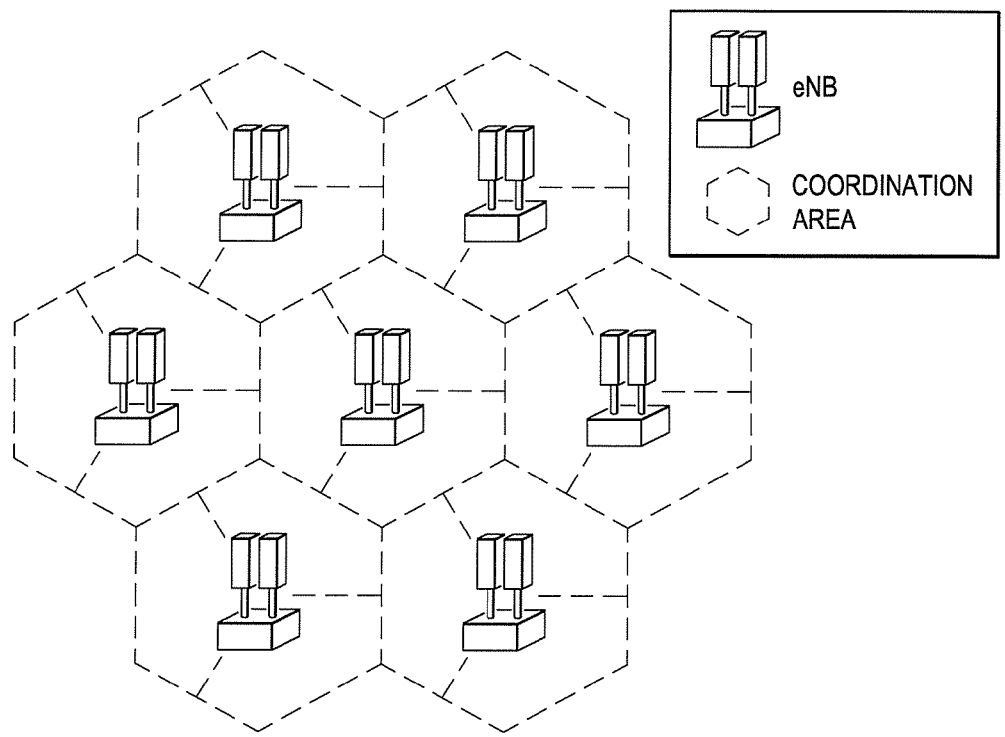
FIG. 5 illustrates a homogeneous network with intra-site CoMP.

Scenario 1: Homogeneous network with intra-site CoMP, as illustrated in FIG. 5.

Figure 6:
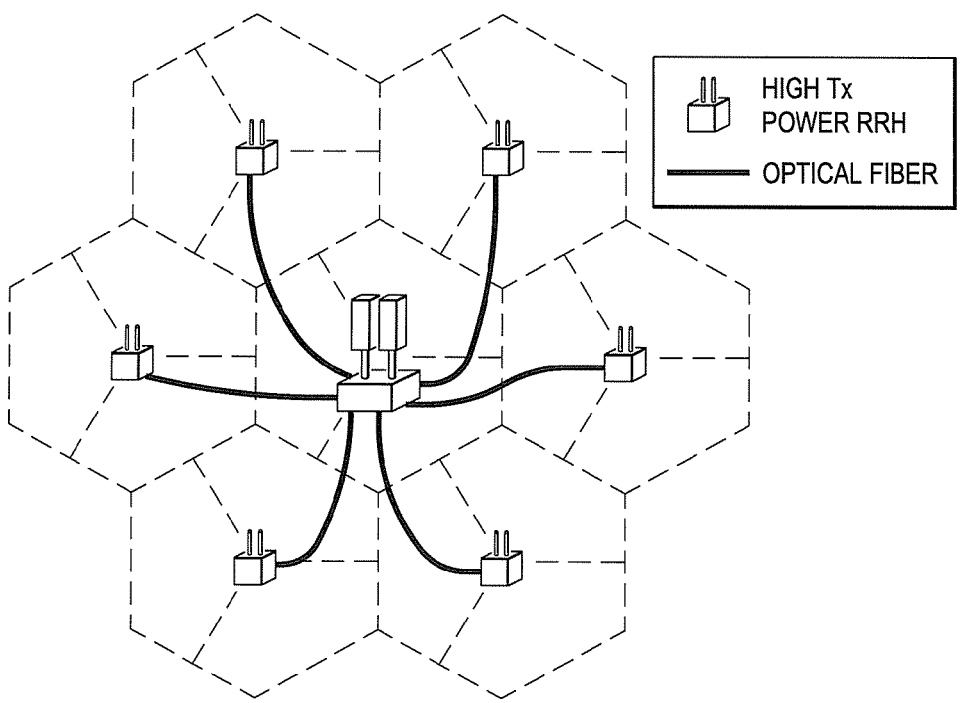
FIG. 6 illustrates a homogeneous network with high Tx power RRHs.

Scenario 2: Homogeneous network with high Tx power RRHs, as illustrated in FIG. 6.

Figure 7:
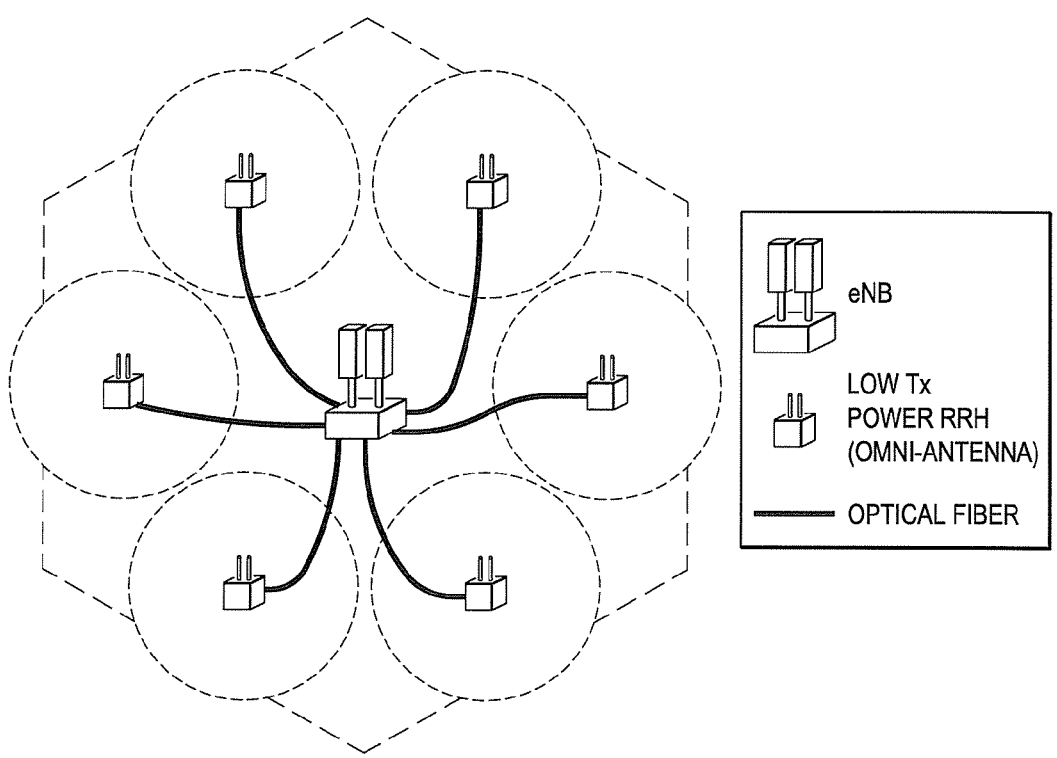
FIG. 7 illustrates a network with low power RRHs within the macrocell coverage.

Scenario 3: Heterogeneous network with low power RRHs within the macrocell coverage where the transmission/reception points created by the RRHs have different cell IDs as the macro cell as illustrated in FIG. 7.

Scenario 4: Heterogeneous network with low power RRHs within the macrocell coverage where the transmission/reception points created by the RRHs have the same cell IDs as the macro cell as illustrated in FIG. 7.

Figure 8:
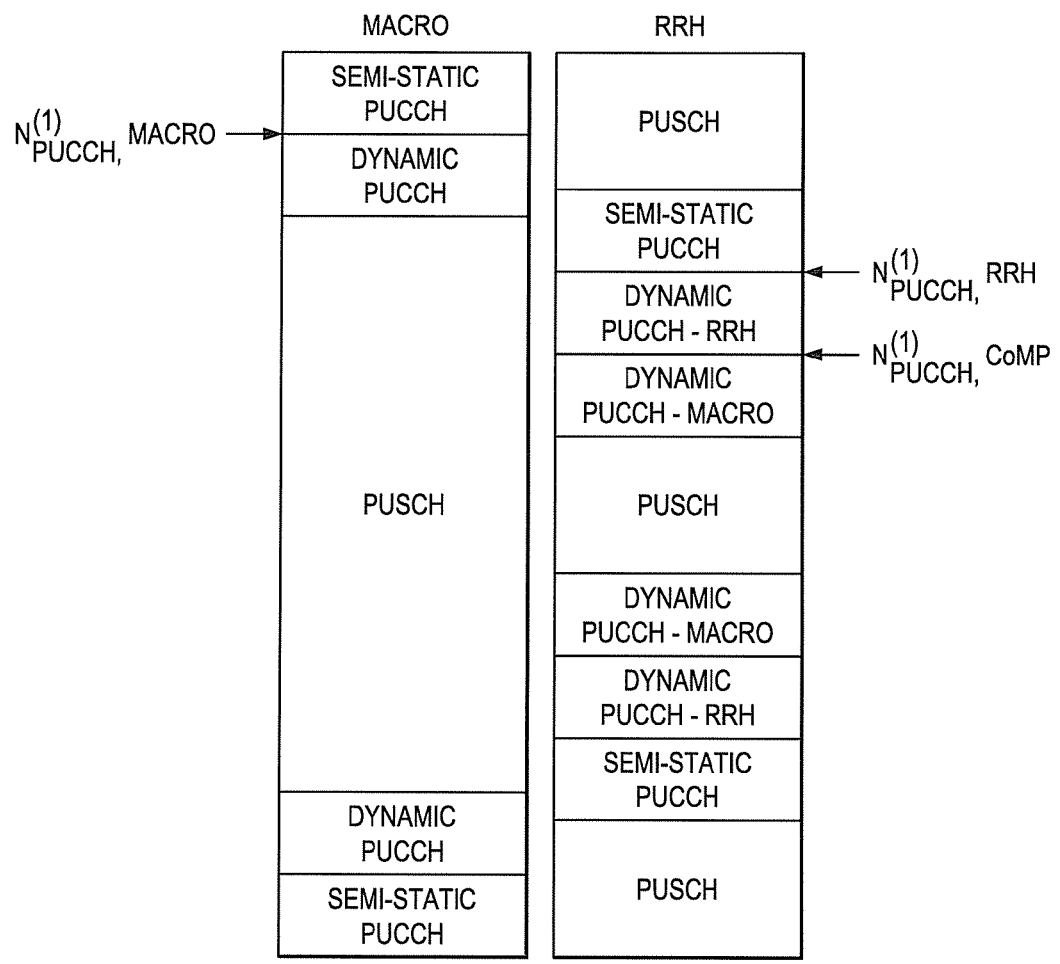
FIG. 8 illustrates an example for a Partitioning of Resources for UL CoMP.

In Samsung contribution R1-121639, one example of PUCCH resource partition for CoMP Scenario 3 is considered as shown in FIG. 8. The contribution also discusses the issues associated with the example as in the following.

Several possible partitions of CoMP and non-CoMP UL resources exist. FIG. 8 shows an example of a partitioning of the UL resources for the macro-eNB and an RRH for CoMP Scenario 3. A similar partitioning may apply for CoMP Scenario 4 by configuring the sequence for HARQ-ACK transmissions in the CoMP region of the RRH resources a UE-specific manner.

Regardless of whether RRC signaling or dynamic signaling is used to indicate the beginning of the CoMP PUCCH resources ($N_{PUCCH,CoMP}^{(1)}$ value) for HARQ-ACK signal transmissions using PUCCH format 1a/1b (with channel selection in case of TDD), an UL overhead increase occurs. It is noted that the number of UEs scheduled PDSCH or SPS release per subframe is largely independent of whether UL CoMP is used for HARQ-ACK signal transmissions and therefore, in principle, there should not be an increase in the respective PUCCH resources.

Moreover, when UL CoMP is applied, only few UEs per subframe on average may require HARQ-ACK transmission using CoMP resources which may lead to significant underutilization.

When PUCCH CoMP resources need to be assigned to only one or few dynamic HARQ-ACK transmissions, multiple PRBs may be used for a single or few HARQ-ACK transmissions if the PUCCH resource $n_{PUCCH}$ is implicitly determined as $n_{PUCCH}=n_{CCE}+N_{PUCCH}^{(1)}$ where $n_{CCE}$ is the first CCE of the respective PDCCH and $N_{PUCCH}^{(1)}=N_{PUCCH,CoMP}^{(1)}$ is an offset configured either dynamically or by RRC. If the value of $n_{CCE}$ is large, multiple PRBs may be used to convey only a single or few HARQ-ACK transmissions. For example, for a 20 MHz BW, $N_{CCE}$=87 CCEs (2 CRS ports), and 20 legacy PUCCH PRBs (80 PUSCH PRBs), $\lceil N_{CCE} \cdot \Delta_{shift}^{PUCCH}/(N_{sc}^{RB} \cdot N_{oc}) \rceil$ PRBs are required for HARQ-ACK signal transmissions using PUCCH format 1a/1b which for $\Delta_{shift}^{PUCCH}$=2 or $\Delta_{shift}^{PUCCH}$=3 shift is equivalent to 5 or 8 additional PRBs respectively. Therefore, the additional CoMP resources for dynamic HARQ-ACK transmissions with PUCCH format 1a/1b from macro-UEs may reduce UL throughput by an additional 6%-10% only for supporting a very small number of UEs.

An overhead increase in the order of 6%-10% is unacceptable and should be substantially reduced. One option for such reduction is by scheduler restrictions where small CCE numbers are used for PDCCH transmissions to UEs for which CoMP resources are used for the respective HARQ-ACK signal transmissions using PUCCH format 1a/1b. However, aside of increasing the blocking probability and imposing scheduler restrictions, this option can only have limited benefits as the first 16 CCEs are typically used in the CSS for PDCCHs scheduling system information.

A Search Space Design for Localized ePDCCH

Figure 9:
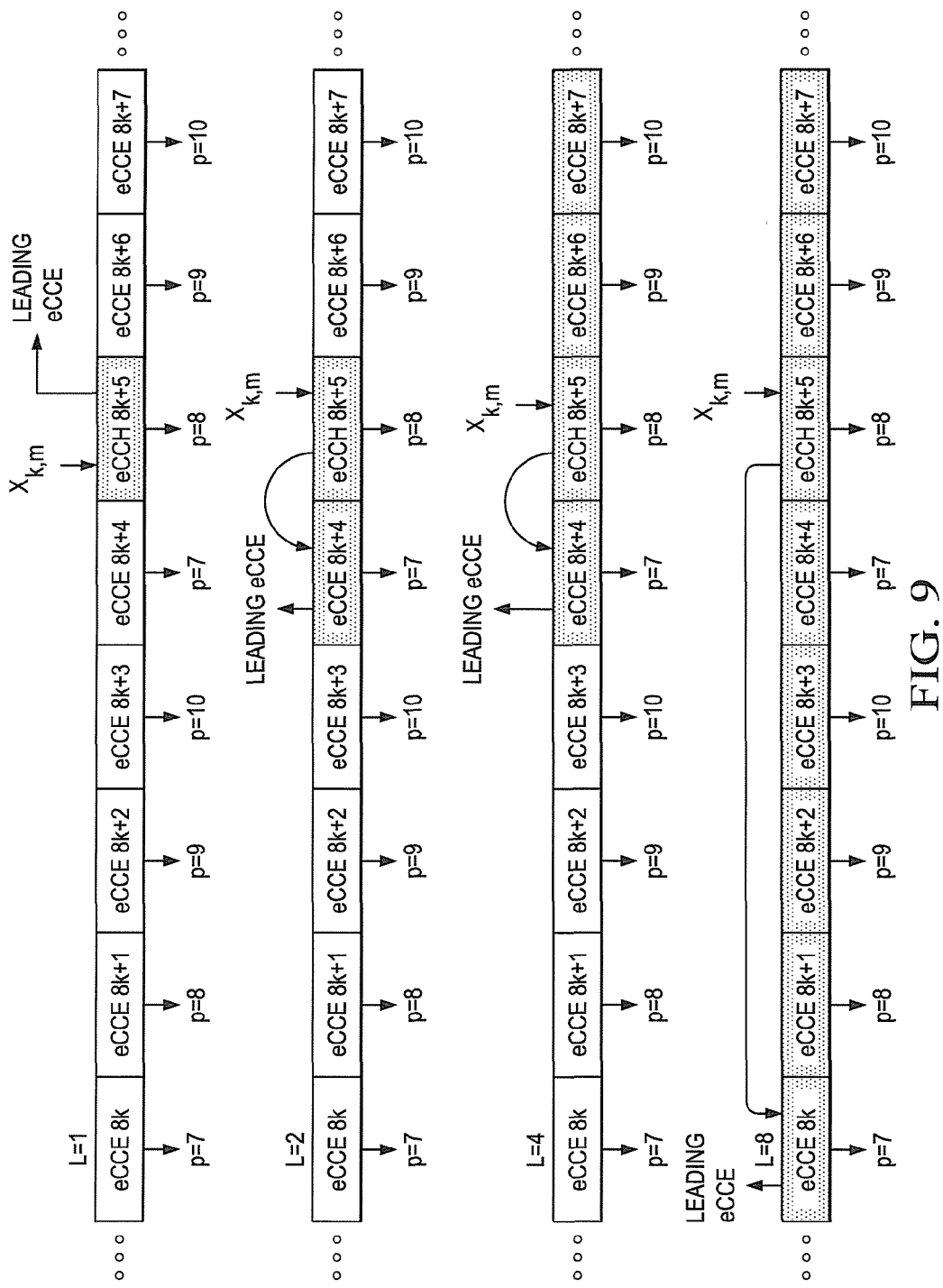
FIG. 9 is an example of the decision of the leading eCCE and the DMRS port for localized ePDCCH transmissions according to some embodiments in the current invention.

FIG. 9 illustrates an exemplary embodiment on how to decide the leading eCCE and the DMRS port for defining a search space for localized ePDCCH. The ePDCCH search space indicates the ePDCCH candidates and the associated DMRS port while the SCID of the DMRS is configured by a higher layer.

For eCCE aggregation levels L∈{1, 2, 4, 8}, the eCCEs corresponding to ePDCCH candidate m are given by, e.g.:

CCEs for ePDCCH candidate m:

$$L \cdot \lfloor X_{k,m}/L \rfloor + i \quad \text{(eq. 9)}$$

Example 1 to determine $X_{k,m}$:

In one example, $X_{k,m}=(Y_k+L \cdot m') \bmod(L \lfloor N_{eCCE,k}/L \rfloor)$, $N_{eCCE,k}$ is the total number of eCCEs for the localized ePDCCHs in subframe k and l=0, ..., L−1. If ePCFICH is not introduced for dynamic configuration of the localized control region size, $N_{eCCE,k}$ is determined by higher layer signaling and does not vary depending on subframe index k. For the UE-SS, for the serving cell on which ePDCCH is monitored, if the monitoring UE is configured with carrier indicator field then m'=m+$M^{(L)} \cdot n_{CI}$ where $n_{CI}$ is the carrier indicator field value, else if the monitoring UE is not configured with carrier indicator field then m'=m, where m=0, ..., $M^{(L)}$−1, and $M^{(L)}$ is the number of ePDCCH candidates to monitor in the search space.

Example 2 to determine $X_{k,m}$:

$$X_{k,m}=(Y_k+m') \bmod(N_{ECCE,k})$$

and $$m'=N_{ECCEperPRB} \cdot (m+M^{(L)} \cdot n_{CI}) + L \cdot \lfloor N_{ECCEperPRB}(m+M^{(L)} \cdot n_{CI})/N_{ECCE,k} \rfloor.$$

Here, $N_{ECCE,k}$ is the total number of ECCEs in a localized EPDCCH set in subframe k, $N_{ECCEperPRB}$=4 (or $N_{ECCEperPRB}$=2) is the total number of ECCEs per PRB pair, $n_{CI}$ is the CIF value (as in Rel-10 CA), m=0, ..., $M^{(L)}$−1, and $Y_k$ is the Rel-10 pseudo-random variable based on the C-RNTI with $Y_k=(A \cdot Y_{k-1}) \bmod D$, where $Y_{-1}=n_{RNTI} \neq 0$, A=39827, D=65537 and k=$\lfloor n_s/2 \rfloor$, $n_s$ is the slot number within a radio frame.

For AL of 8 ECCEs, when supported, the ECCEs are obtained as for AL of 4 ECCEs by including an additional PRB pairs (in same RBG—same for the case of 2 ECCEs per PRB pairs and an AL of 4 ECCEs) REF3.

In the equation to determine m', the first term selects the PRB pair and the second term selects the ECCEs within a PRB pair. Localized EPDCCH candidates are first placed in different PRB pairs. If the number of candidates (for a given ECCE AL) is greater than the number of PRB pairs then, at each iteration of placing a candidate in a PRB pair, the additional candidates are placed in different PRB pairs while avoiding overlap with ECCEs used by previous candidates.

Determination of DMRS APs

The DMRS AP, $p_{k,m}$, for candidate m in subframe k can be part of the search space and is determined as $$p_{k,m}=107+(X_{k,m}-N_{ECCEperPRB} \lfloor X_{k,m}/N_{ECCEperPRB} \rfloor) \bmod N_{DMRS}$$

where $N_{DMRS}$ is the number of DMRS APs.

In this embodiment, a random variable $X_{k,m}$ points an eCCE. FIG. 9 shows an example of the decision of the leading eCCE and the DMRS port in this embodiment. In this example, $N_{DMRS}$=4 is assumed. Each eCCE is mapped to a DMRS port such as:

eCCE 4n is mapped to DMRS port 7.
eCCE 4n+1 is mapped to DMRS port 8.
eCCE 4n+2 is mapped to DMRS port 9.
eCCE 4n+3 is mapped to DMRS port 10.

In the example of FIG. 9, $X_{k,m}$ pointed eCCE 8k+5. When the LTE Rel-8 rule of making a PDCCH candidate is applied to this example, it leads to the following ePDCCH construction method for each aggregation level:

In case of L=1, eCCE 8k+5 will construct an ePDCCH candidate with the leading eCCE 8k+5.

In case of L=2, eCCEs 8k+4 and 8k+5 will construct an ePDCCH candidate with the leading eCCE 8k+4.

In case of L=4, eCCEs 8k+4 to 8k+7 will construct an ePDCCH candidate with the leading eCCE 8k+4.

In case of L=8, eCCEs 8k to 8k+7 will construct an ePDCCH candidate with the leading eCCE 8k.

The DMRS port is decided by the leading eCCE of an ePDCCH candidate. On the other hand, the DMRS port is decided by $X_{k,m}$. This allows multiple UEs to have a given ePDCCH candidate with orthogonal DMRS ports and this operation implicitly supports the orthogonal DMRS assisted MU-MIMO of ePDCCHs.

Figure 10:
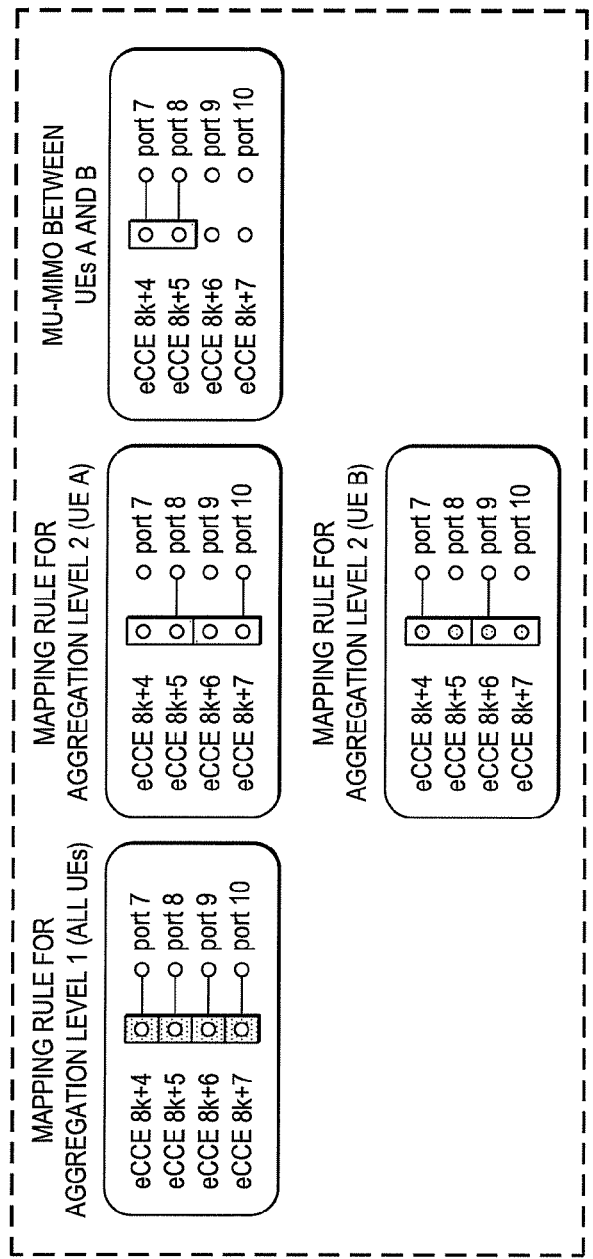
FIG. 10 illustrates an example of DMRS port linkage.

For example, assuming that a random variable $X_{k,m}$ for a UE (UE-a) points eCCE 8k+5 and that for another UE (UE-b) points eCCE 8k+4. In case of L=2, both UEs will have the same ePDCCH candidate which consists of eCCEs 8k+4 and 8k+5. Both UEs who have the ePDCCH candidate are supposed to use same DMRS port 7 as shown in FIG. 10. To support MU-MIMO, both UEs should be assigned different SCID. This is the operation of non-orthogonal DMRS assisted MU-MIMO. On the other hand, UE-a and UE-b will be assigned DMRS ports 8 and 7, respectively, as shown in FIG. 10. It allows the orthogonal DMRS assisted MU-MIMO.

In this embodiment, the non-orthogonal DMRS assisted MU-MIMO is also supportable by either configuring the SCID of the DMRS either via a UE-specific higher layer signaling or determining it by a parameter, e.g. the transmission point identification (TPID) in the distributed antenna systems.

Therefore, this embodiment supports both orthogonal DMRS assisted MU-MIMO and non-orthogonal DMRS assisted MU-MIMO and presents more flexibility in ePDCCH scheduling to the eNB.

Therefore, there is a need in the art for determining at least part of a PUCCH resource index $n_{PUCCH}^{(1)}$ (PUCCH format 1a/1b) associated with an ePDCCH PRB set.

In the present disclosure, an LTE UE transmits a HARQ-ACK on PUCCH format 1a/1b in response to a PDSCH transmission scheduled by a DL assignment on either PDCCH or ePDCCH. The DL grant on PDCCH is transmitted in a number of control channel elements (CCEs), where each CCE is indexed by integer numbers, denoted by $n_{CCE}$. The DL assignment on ePDCCH is transmitted in a number of enhanced CCEs (eCCEs), where each enhanced eCCE is indexed by integer numbers, denoted by $n_{eCCE}$.

Up to Rel-10 LTE system, the UE derives the PUCCH format 1a/1b index $n_{PUCCH}$ in response to a dynamically scheduled PDSCH by the following equation, $$n_{PUCCH}=n_{CCE}+N_{PUCCH}^{(1)}$$

where $n_{CCE}$ is the smallest CCE number conveying the DL assignment, and $N_{PUCCH}^{(1)}$ is cell-specifically higher-layer (RRC) configured.

For configuring PUCCH UL CoMP, a Rel-11 UE may receive an RRC configuration comprising a number of UE-specific parameters. Some examples of UE-specific parameters are:

A PUCCH virtual cell ID X to replace the physical cell ID in the legacy equations for UL RS base sequence generation.

A UE-specific PUCCH resource offset $N_{PUCCH-UE}^{(1)}$ to replace $N_{PUCCH}^{(1)}$ in the legacy PUCCH format 1a/1b indexing equation.

It is noted that the two parameters X and $N_{PUCCH-UE}^{(1)}$ may be jointly or independently configured. In one example of the joint configuration, X can only be configured when $N_{PUCCH-UE}^{(1)}$ is configured. In another example of joint configuration, $N_{PUCCH-UE}^{(1)}$ can only be configured when X is configured.

Figure 11:
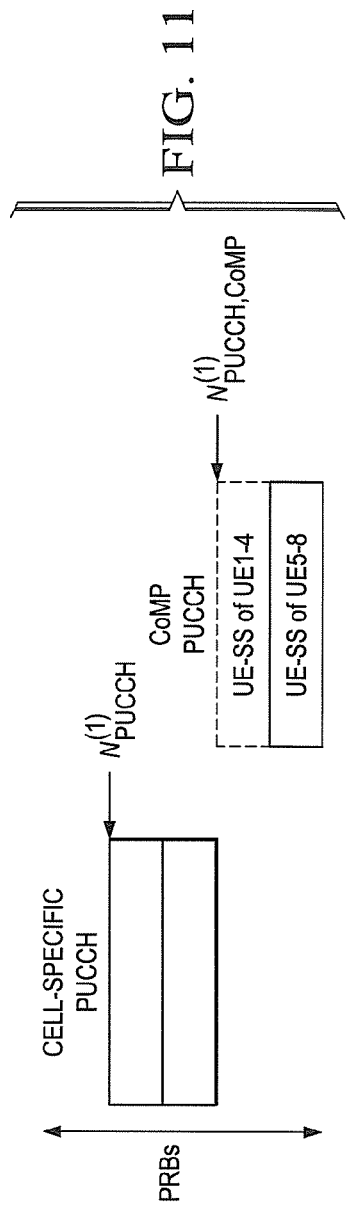
FIG. 11 illustrates scheduling restrictions when the two PUCCH regions overlap.

When the network assigns overlapping regions for the HARQ-ACKs generated with different base sequences, the overhead issue may be somewhat mitigated; however, significant scheduling restrictions may still be imposed in order to prevent resource collisions if any meaningful overhead reduction is to be achieved. More specifically, in order to prevent the resource collision, the overlapped region should be used for PUCCHs generated with the same base sequence. For example, for resource collision avoidance, the overlapped region should only contain PUCCHs generated with physical cell ID. Considering that the PDCCH hashing function changes the UE-specific search space every subframe for each UE, the only way to ensure this is that eNB does not transmit any DL grants for those UEs who are assigned with a virtual cell ID and happen to have the UE-specific search space in the overlapped region. As illustrated in FIG. 11, in subframes when UEs 1-4 has UE-specific search space in the overlapped PRB, eNB should not transmit DL grants to UE 1-4 for avoiding collision. Depending on the number of UL CoMP UEs, this may increase blocking probability and reduce DL throughout ("many" UL CoMP UEs) or it may result to significant underutilization of the CoMP PUCCH resources ("few" UL CoMP UEs) thereby decreasing UL throughput.

For avoiding collision of resources between PUCCH HARQ-ACKs in response to ePDCCH and PDCCH, one proposal discussed in RAN1 is to introduce a UE-specific PUCCH offset, e.g., $N_{PUCCH-UE-ePDCCH}^{(1)}$ to replace $N_{PUCCH}^{(1)}$ in the PUCCH format 1a/1b indexing equation.

If both of $N_{PUCCH-UE}^{(1)}$ and $N_{PUCCH-UE-ePDCCH}^{(1)}$ are introduced, the resulting PUCCH HARQ-ACK overhead could be triple/quadruple as compared to the legacy PUCCH, which may not be desirable.

In order for eNBs to efficiently managing the PUCCH overhead, a new PUCCH format 1a/1b indexing mechanism needs to be introduced to support PUCCH UL CoMP and ePDCCH.

Exemplary Embodiment 1

Depending on whether a DL assignment is carried in the PDCCH or the ePDCCH, a UE differently derives the index of PUCCH format 1a/1b $n_{PUCCH}$ to carry HARQ-ACK in response to a PDSCH scheduled by the DL assignment.

When PDCCH carries the DL assignment, the UE uses the following equation to derive $n_{PUCCH}$, where the smallest CCE number used for carrying the DL assignment is $n_{CCE}$:

$$n_{PUCCH}=n_{CCE}+N.$$

When ePDCCH carries the DL assignment, the UE uses the following equation to derive $n_{PUCCH}$:

$$n_{PUCCH}=n_{eCCE}+N'+n_{offset}$$

This embodiment can effectively avoid collision of PUCCH HARQ-ACK resources by configuring a non-zero $n_{offset}$, when two PUCCH resources are implicitly determined by a legacy PDCCH CCE number, and a ePDCCH eCCE number and the CCE number and the eCCE number happen to be the same.

Exemplary Embodiment 2

A UE derives the index of PUCCH format 1a/1b $n_{PUCCH}$ to carry HARQ-ACK in response to a PDSCH scheduled by a DL assignment as in the following:

When PDCCH carries the DL assignment, the UE uses the following equation to derive $n_{PUCCH}$, where the smallest CCE number used for carrying the DL assignment is $n_{CCE}$:

$$n_{PUCCH}=n_{CCE}+N+n_{offset}$$

When ePDCCH carries the DL assignment, the UE uses the following equation to derive $n_{PUCCH}$:

$$n_{PUCCH} = n_{eCCE} + N' + n_{offset}.$$

This embodiment can effectively avoid collision of PUCCH HARQ-ACK resources by configuring different $n_{offset}$'s for the two PUCCH HARQ-ACKs in response to a PDCCH and an ePDCCH.

Details regarding the parameters in the equations for $n_{PUCCH}$ are explained below.

Determination of N and N'

In one method, N'=N, in which case the network (eNB) configures only one value for the N and N'.

In another method, N'≠N, in which case the network (eNB) configures a first and a second values for N and N' respectively.

In one method, the value of N (and also N' in case N'=N) is determined depending on whether a UE-specific $N_{PUCCH-UE}^{(1)}$ is configured or not.

In one example, when $N_{PUCCH-UE}^{(1)}$ is configured, $N=N_{PUCCH-UE}^{(1)}$ i.e., the UE-specific resource offset; otherwise $N=N_{PUCCH}^{(1)}$ i.e., the legacy cell-specific resource offset.

In another method, the value of N' is determined depending on whether a UE-specific $N_{PUCCH-UE-ePDCCH}^{(1)}$ is configured or not.

In one example, when $N_{PUCCH-UE-ePDCCH}^{(1)}$ is configured, $N'=N_{PUCCH-UE-ePDCCH}^{(1)}$, i.e., the UE-specific resource offset; otherwise $N'=N_{PUCCH}^{(1)}$, i.e., the legacy cell-specific resource offset.

In one method, eNB may only be able to configure $N'=N_{PUCCH-UE-ePDCCH}^{(1)}$, and N is the same as the cell specific offset, i.e., $N_{PUCCH}^{(1)}$.

In another method, eNB may only be able to configure $N=N_{PUCCH-UE}^{(1)}$, and N' is the same as the cell specific offset, i.e., $N_{PUCCH}^{(1)}$.

In one method, the value of N (and also N' in case N'=N) is determined by at least one of the CFI value (or the number of OFDM symbols used for legacy PDCCH region) indicated by PCFICH in the current subframe and the UE-specifically configured parameter, $N_{PUCCH-UE}^{(1)}$. In a first example, $$N = N_{PUCCH-UE}^{(1)} - (3-CFI) \cdot N_{CCEs}^{symbol}.$$

In a second example, $$N = N_{PUCCH-UE}^{(1)} + (CFI-1) \cdot N_{CCEs}^{symbol}.$$

Figure 12:
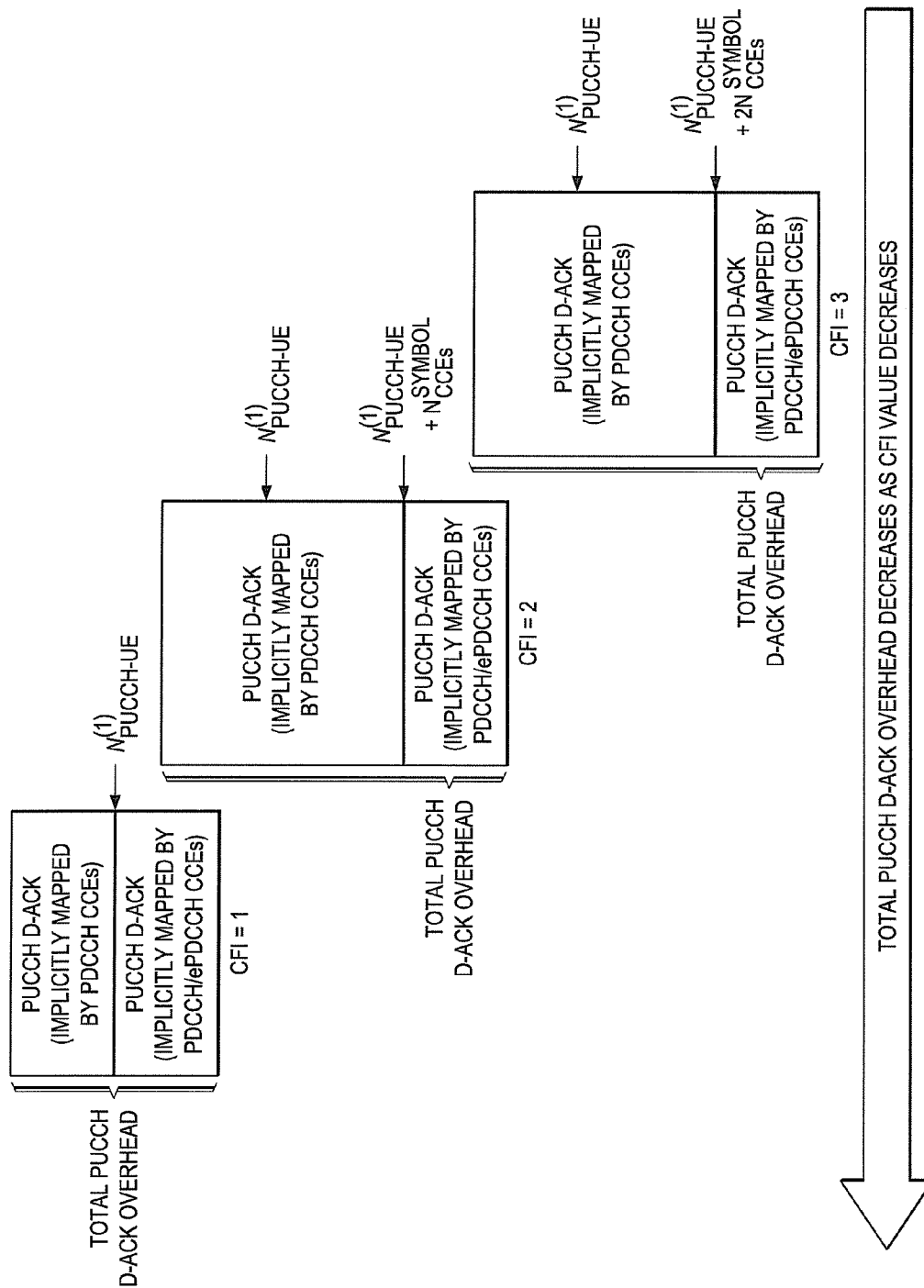
FIG. 12 illustrates PUCCH D-ACK region implicitly mapped by ePDCCH CCEs (or eCCEs) changes depending on the values of CFI.

In these examples, $N_{CCEs}^{symbol}$ the total number of CCEs per OFDM symbol. The second example case is illustrated in FIG. 12. As illustrated in FIG. 12, this method can efficiently control the PUCCH D-ACK (dynamic ACK/NACK) resource overhead by dynamically changing the starting region of PUCCHs associated with ePDCCHs.

When $N_{PUCCH-UE}^{(1)}$ is not configured, $N=N_{PUCCH}^{(1)}$.

When $N_{PUCCH-UE}^{(1)}$ is configured, the starting position of the 2nd PUCCH region where the virtual cell ID is used for generating the PUCCH base sequence is determined. In addition, having $n_{offset}$, the PUCCH resource collision caused from the implicit indexing of the resource by CCE and eCCE numbers can be avoided. For example, when eNB transmits two DL assignments to two different UEs where one DL assignment is carried in the PDCCH and the other DL assignment is carried in the ePDCCH, and the corresponding smallest CCE number and eCCE number happen to be the same, the resource collision can be avoided by setting a non-zero $n_{offset}$ for a UE receiving ePDCCH.

In one method, the UE is also configured with the virtual cell ID X, in which case the UE generates PUCCH base sequence with replacing the physical cell ID with X in the legacy equations for UL RS base sequence generation.

In one method, the virtual cell ID X and the UE-specific resource offset $N_{PUCCH-UE}^{(1)}$ are jointly configured.

Definition of $n_{eCCE}$

Some alternatives for the definition of $n_{eCCE}$ are listed below:

Alt 1: the smallest eCCE number used for carrying the DL assignment.

Alt 2: an eCCE number associated with a selected DM RS antenna port for the DL assignment transmission (one example of such an association is shown in FIG. 10)

Alt 3: an eCCE number indicated by the random variable $X_{k,m}$ (as shown in FIG. 9).

Alt 4: The definition of $n_{eCCE}$ changes depending on whether localized ePDCCH or distributed ePDCCH is used.

In one example, in case distributed ePDCCH is used, $n_{eCCE}$ is the smallest eCCE number used for carrying the DL assignment; on the other hand, in case localized ePDCCH is used, $n_{eCCE}$ is an eCCE number associated with a selected DM RS antenna port for the DL assignment transmission.

In another example, in case distributed ePDCCH is used, $n_{eCCE}$ is the smallest eCCE number used for carrying the DL assignment; on the other hand, in case localized ePDCCH is used, $n_{eCCE}$ is an eCCE number indicated by the random variable $X_{k,m}$.

Alt 2, Alt 3, Alt 4 can make sure that two UEs receiving DL assignments in the same set of eCCEs send PUCCH HARQ-ACK in two different resources. To see this, suppose that a first and a second UEs receive DL assignments in the same set of eCCEs, say, eCCEs #0 and #1, while the first and the second UEs are assigned DMRS antenna ports (APs) 7 and 8 respectively for the ePDCCH demodulation. When the smallest eCCE number ($n_{leading-eCCE}$) is used for PUCCH HARQ-ACK indexing with $n_{offset}=0$, the two UEs will be assigned the same PUCCH resource, $n_{PUCCH}=n_{leading-eCCE}+N+n_{offset}=0+N+0=N$. To resolve this resource collision, any of Alt 2, Alt 3, Alt 4 can be used.

In one method, $n_{eCCE}$ is the same as an eCCE number associated with a selected DM RS antenna port for the DL assignment transmission, and the first UE and the second UE can use different $n_{eCCE}$ numbers to derive the PUCCH resources, because the two UEs are assigned two different APs for the ePDCCH demodulation. In particular, the first UE derives $$n_{eCCE} = n_{leading-eCCE} + (p_1 - 7) = 0 + (7-7) = 0,$$

and the second UE derives $$n_{eCCE} = n_{leading-eCCE} + (p_2 - 7) = 0 + (8-7) = 1,$$

where p1 and p2 are the assigned DMRS port numbers for the first and the second UEs respectively.

According to the current method, the following example cases are considered.

In case of 8-CCE aggregation in the localized ePDCCH, the DL grant may be transmitted across two PRBs (or VRBs), and hence two eCCE numbers may correspond to the selected antenna port p, one per PRB; then, $n_{eCCE}$ is the smallest one out of the two eCCE numbers, selected according to $n_{eCCE} = n_{leading-eCCE} + (p-7)$.

In the distributed ePDCCH, number of DM RS antenna ports associated with the DL assignment transmission can be more than one. In this case, $n_{eCCE}$ does not depend on the selected DM RS antenna port number and $n_{eCCE}$ is the smallest eCCE number, i.e., $n_{leading-eCCE}$.

In another method, $n_{eCCE}$ is the same as an eCCE number indicated by the random variable $X_{k,m}$ as shown in FIG. 9 and related text in the background section. Two UEs receive DL assignments in the same set of eCCEs in the same aggregation level (L=2), say, eCCEs 8k+4 and 8k+5, are assigned two different PUCCH resources, as long as the two UEs have different $X_{k,m}$'s. Suppose that a first UE's and a second UE's $X_{k,m}$ are 8k+4, and 8k+5 respectively. Then the $n_{eCCE}$'s of the first and the second UEs are determined to be 8k+4 and 8k+5 respectively, i.e., $$n_{eCCE}=X_{k,m}.$$

Derivation of the Antenna Port Number p to be Used for the Demodulation of an ePDCCH In one method, the antenna port number p is determined at least partly upon the UE-ID (or an RNTI), i.e., p=f(RNTI), where f(.) is a function. Some examples are:

$$p=(RNTI \bmod 4)+7;$$

$$p=(RNTI \bmod 2)+7.$$

In another method, the antenna port number p is determined by the random variable $X_{k,m}$ introduced in FIG. 9 and FIG. 10.

Definition of $n_{offset}$:

Regarding the $n_{offset}$, the following alternative indication methods can be considered.

Alt 0: The value of $n_{offset}$ is a constant (e.g., 0).

Alt 1: The value of $n_{offset}$ is dynamically indicated by a field (or a code-point) in the DL assignment.

Alt 2: The value of $n_{offset}$ is determined by a function of the UE-ID (or RNTI, e.g. C-RNTI).

Alt 3: The value of $n_{offset}$ is determined by a function of a first and a second parameters, where the second parameter is dynamically indicated by a field (or a code-point) in the DL assignment.

Alt 4: Whether the value of $n_{offset}$ is dynamically indicated by a field (or a code point) in the DL assignment or $n_{offset}$ is a constant value (e.g, 0) is configured by a parameter signaled in the higher layer (e.g., RRC).

Alt 5: The value of $n_{offset}$ is RRC configured.

The field in Alt 1, Alt 3 and Alt 4 is denoted as ACK/NACK Resource Indicator (ARI), and an $N_{ARI}$-bit ARI can indicate one out of $2^{N_{ARI}}$ candidate numbers. The indicated value by the ARI is called Y. Some examples of indicating Y using ARI are shown in below tables, when $N_{ARI}=1$ or 2.

| $N_{ARI}$ (=2)-bit ARI | (Example 1) An indicated value of Y | (Example 2) An indicated value of Y |
|---|---|---|
| 00 | 0 | Alt 1: A first RRC configured value |
|  |  | Alt 2: Fixed to be zero |
| 01 | +1 | A second RRC configured value |
| 10 | −1 | A third RRC configured value |
| 11 | +2 | A fourth RRC configured value |

| $N_{ARI}$ (=1)-bit ARI | (Example 3) An indicated value of Y | (Example 4) An indicated value of Y |
|---|---|---|
| 0 | 0 | Alt 1: A first RRC configured value |
|  |  | Alt 2: Fixed to be zero |
| 1 | +1 | A second RRC configured value |

In one method, the value of $n_{offset}$ is dynamically indicated by the ARI field in the DL assignment, according to a relation of $n_{offset}=Y$. In this case, a person having ordinary skill in the art will see that $n_{PUCCH}=n_{eCCE}+N'+Y$. when ePDCCH carries the DL assignment according to exemplary embodiments 1 and 2. In an earlier embodiment, in case distributed ePDCCH is used, $n_{eCCE}$ is the smallest eCCE number used for carrying the DL assignment; on the other hand, in case localized ePDCCH is used, $n_{eCCE}$ is an eCCE number indicated by the random variable $X_{k,m}$. It is also noted that in later embodiments, g(RNTI) is sometimes referred to by Δ.

In another method, the value of $n_{offset}$ is determined by a function of a first parameter and a second parameters. For example, the first parameter is UE-ID (or RNTI), and the second parameter is ARI or Y. One example function for $n_{offset}$ is:

$n_{offset}=Y+g(RNTI)$. In this case, a person having ordinary skill in the art will see that $n_{PUCCH}=n_{eCCE}+N'+Y+g(RNTI)$ when ePDCCH carries the DL assignment according to exemplary embodiments 1 and 2. In an earlier embodiment, in case distributed ePDCCH is used, $n_{eCCE}$ is the smallest eCCE number used for carrying the DL assignment; on the other hand, in case localized ePDCCH is used, $n_{eCCE}$ is an eCCE number indicated by the random variable $X_{k,m}$. It is also noted that in later embodiments, g(RNTI) is sometimes referred to by Δ.

Here, examples for g(.) are:

$$g(RNTI)=(RNTI \bmod 4);$$

$$g(RNTI)=(RNTI \bmod 2).$$

In another method, the value of $n_{offset}$ is determined by a function of the UE-ID (or RNTI, e.g. C-RNTI).

In one example, $n_{offset}=(RNTI \bmod 4)$.

In another example, $n_{offset}=(RNTI \bmod 2)$.

In one method, explicit $N_{ARI}$ bits are added to an existing DCI format to carry a DL assignment (e.g., DCI format 1A, 2/2A/2B/2C) to carry the $n_{offset}$ information, where example values for $N_{ARI}$ are 1 and 2.

In one method,

When DCI formats 2B/2C are used for carrying the DL assignment, the SCID field is used for indicating one out of 2 candidate values for the $N_{ARI}(=1)$-bit ARI. One example indication method is shown in the below table.

| SCID | ARI |
|---|---|
| 0 | 0 |
| 1 | 1 |

When DCI formats 1/1A/2/2A/1C (which does not have the SCID field) are used for the DL assignment, Y is fixed to be 0.

It is noted that DCI formats 2B and 2C are used for scheduling PDSCHs on antenna ports 7-14, for which UE-specific reference signals (UE-RS) are provided on the same antenna ports. On the other hand, when a UE receives ePDCCH, the UE is required to do channel estimation with UE-RS (antenna ports 7-10). Hence, the UE is more likely to receive DCI formats 2B and 2C on the ePDCCH, for which it would be good to provide ARI to prevent PUCCH resource collision.

In one method,

When DCI formats 2B/2C are used for carrying the DL assignment, the indicated rank (or number of layers) and the indicated antenna port number(s) are used for indicating one out of 2 candidate values for the $N_{ARI}$ (=1)-bit ARI. One example indication method is shown in the below table.

| (Rank, Antenna port number) | ARI |
|---|---|
| (1, 7) | 0 |
| (1, 8) | 1 |
| (2-8, —) | Alt 1: 0 |
|  | Alt 2: 1 |

When DCI formats 1/1A/2/2A/1C (which does not indicate the antenna port number(s)) are used for the DL assignment, Y is fixed to be 0.

In one method,

When DCI formats 2B/2C are used for carrying the DL assignment, the indicated rank (or number of layers), the indicated antenna port number(s) and SCID field are used for indicating one out of candidate values for the ARI. One example indication method is shown in the below table.

| (Rank, Antenna port number) | SCID | ARI |
|---|---|---|
| (1, 7) | 0 | 0 |
| (1, 7) | 1 | 1 |
| (1, 8) | 0 | 2 |
| (1, 8) | 1 | 3 |
| (2, 7-8) | 0 | 0 |
| (2, 7-8) | 1 | 1 |
| (3-8, —) | 0 | 0 |

When DCI formats 1/1A/2/2A/1C (which does not indicate the antenna port number(s)) are used for the DL assignment, Y is fixed to be 0.

In one method, one PRB number out of PDSCH's PRB numbers (scheduled by the ePDCCH or PDCCH) indicates a state in the ARI. Here, the one PRB number can be the smallest one out of the scheduled PDSCH's PRB numbers.

In one method, HARQ process ID in the current DL grant DCI format indicates a state in the ARI.

In one method, redundancy version (RV) in the current DL grant DCI format indicates a state in the ARI.

In one method, the $N_{ARI}$-bit ARI is included only in the DL assignments transmitted in a first region; the indication field is not included in the DL assignments transmitted in a second region.

In one example, the first region is the ePDCCH and the second region is the legacy PDCCH.

In another example, the first region is the localized ePDCCH and the second region is the distributed ePDCCH.

In still other example, the first region is the ePDCCH and the legacy PDCCH UE-specific search space; and the second region is legacy PDCCH common search space.

Suppose that a UE-specific search space of a UE configured with ePDCCH is split into the two regions. In this case, the total number of blind decodes A for the UE-specific search space is sum of two numbers, B and C, i.e., $A = B + C$, where B and C are the numbers of blind decodes to be done in the first and the second region, respectively.

Example 1

When UL MIMO is not configured, B is the number of blind decodes to be spent for transmission-mode specific DL DCI formats (e.g., DCI formats 1/2/2A/2B/2C and a new DCI format defined for DL CoMP transmission mode).

Example 2

When UL MIMO is configured, B is the number of blind decodes to be spent for transmission-mode specific DL DCI formats (e.g., DCI formats 1/2/2A/2B/2C and a new DCI format defined for DL CoMP transmission mode) and UL MIMO DCI format (i.e., DCI format 4).

Example 3

C is the number of blind decodes to be spent for DCI formats for DL fallback transmissions and UL single-layer transmissions (i.e., DCI format 0 and 1A).

In one embodiment, a UE interprets the ARI bits differently and derives the PUCCH format 1a/1b resource differently, depending on whether the UE is configured with a PUCCH virtual cell ID or not.

When the UE is not configured with the PUCCH virtual cell ID, the UE determines a PUCCH HARQ-ACK resource as in exemplary embodiment 1 or in exemplary embodiment 2, and derives the PRB number, the OCC number and CS number according to 3GPP LTE Rel-10 specifications RE1.

In one method, when the UE is configured with the PUCCH virtual cell ID, each state generated by the ARI bits may indicate how to derive a PRB number to carry the PUCCH format 1a/1b, e.g., whether to follow the Rel-10 specification to derive the PRB number out of $n_{PUCCH}^{(1)}$, or to use a UE-specifically RRC configured number mUE to derive the PRB number.

The states generated by ARI indicate the information to derive a PRB number as in the following tables.

|  | PRB number derivation |
|---|---|
| $N_{ARI}$ (=2)-bit ARI |  |
| 00 | Alt 1: m is derived according to R10 specification with utilizing $n_{PUCCH}^{(1)}$ |
|  | Alt 2: A fourth RRC configured value, $m_{UE, 4}$ |
| 01 | A first RRC configured value, $m_{UE, 1}$ |
| 10 | A second RRC configured value, $m_{UE, 2}$ |
| 11 | A third RRC configured value, $m_{UE, 3}$ |
| $N_{ARI}$ (=1)-bit ARI |  |
| 0 | Alt 1: m is derived according to R10 specification with utilizing $n_{PUCCH}^{(1)}$ |
|  | Alt 2: A second RRC configured value, mUE, 2 |
| 1 | An RRC configured value, mUE, 1 |

$n_{PUCCH}^{(1)} = n_{CCE} + N$ (for PDCCH), or $n_{PUCCH}^{(1)} = n_{eCCE} + N'$ (for PDCCH).

When a UE is indicated to use m=mUE to derive the PRB number, the PRB numbers for PUCCH format 1a/1b are derived according to the following:

The physical resource blocks to be used for transmission of PUCCH in slot $n_s$ are given by $$n_{PRB} = \begin{cases} \left\lfloor \dfrac{m_{UE}}{2} \right\rfloor & \text{if } (m_{UE} + n_s \bmod 2) \bmod 2 = 0 \\ N_{RB}^{UL} - 1 - \left\lfloor \dfrac{m_{UE}}{2} \right\rfloor & \text{if } (m_{UE} + n_s \bmod 2) \bmod 2 = 1 \end{cases}.$$

When the UE is indicated to use mUE for deriving the PRB number, the UE derives the PRB number using the indicated mUE value, while the UE derives the other resource indices, e.g., the OCC number and the CS number according to $n_{PUCCH}^{(1)}$, relying on the method described in the 3GPP LTE Rel-10 specifications REF1.

In one method, the PUCCH virtual cell ID replaces physical cell ID when deriving PUCCH base sequence and CS hopping parameters, only if $N_{ARI}$ is non-zero. if $N_{ARI}$ is zero, the physical cell ID is used for the generation of PUCCH base sequence and CS hopping.

In another method, the PUCCH virtual cell ID is always used for generating PUCCH base sequence and CS hopping (i.e., the virtual cell ID replaces the physical cell ID in the equations) regardless of the indicated value of $N_{ARI}$.

In one method, eNB may UE-specifically RRC configure PRB numbers for which a PUCCH virtual cell ID to be used. When a UE is configured those PRB numbers, the UE transmits PUCCH using the virtual cell ID only when the UE transmits PUCCH in such a PRB.

In another method, when the UE is configured with the PUCCH virtual cell ID, each state generated by the ARI bits may indicate $n'_{offset}$, where $n'_{offset}$ is utilized for deriving $n_{PUCCH}^{(1)}$.

When PDCCH carries the DL assignment, the UE uses the following equation to derive $n_{PUCCH}^{(1)}$, where the smallest CCE number used for carrying the DL assignment is $n_{CCE}$:

$$n_{PUCCH}^{(1)}=n_{CCE}+N. \quad \text{Alt 1:}$$

$$n_{PUCCH}^{(1)}=N+(n_{CCE}+n'_{offset})\bmod N_{CCE}, \quad \text{Alt 2:}$$

where $N_{CCE}$ is can be RRC configured, and can be equal to the total number of CCEs in the current subframe.

When ePDCCH carries the DL assignment, the UE uses the following equation to derive $n_{PUCCH}^{(1)}$:

$$n_{PUCCH}^{(1)}=N+(n_{eCCE}+n'_{offset})\bmod N_{eCCE},$$

where $N_{eCCE}$ is can be RRC configured, and can be equal to the total number of eCCEs in the current subframe.

Here, $n'_{offset}$ can be indicated by ARI, just like $n_{offset}$. Examples for the indication of $n_{offset}$ and $n'_{offset}$ are shown in the below tables, for 1- and 2-bit ARI. In the tables, candidate values for $n_{offset}$ (used when a PUCCH virtual cell ID is not configured in embodiments 1 and 2 are predetermined in the standards specification, and candidate values for $n'_{offset}$ (used when a PUCCH virtual cell ID is configured) are UE-specifically RRC configured.

| $N_{ARI}$ (=2)-bit ARI | An indicated value of $n_{offset}$ | An indicated value of $n'_{offset}$ |
|---|---|---|
| 00 | 0 | Alt 1: A first RRC configured value |
|  |  | Alt 2: Fixed to be zero. |
| 01 | +1 | A second RRC configured value |
| 10 | −1 | A third RRC configured value |
| 11 | +2 | A fourth RRC configured value |

| $N_{ARI}$ (=1)-bit ARI | An indicated value of $n_{offset}$ | An indicated value of $n'_{offset}$ |
|---|---|---|
| 0 | 0 | Alt 1: A first RRC configured value |
|  |  | Alt 2: Fixed to be zero. |
| 1 | +1 | A second RRC configured value |

Due to a circular buffer rate matching for a DL scheduling assignment (SA) transmission, coded bits may repeat and a UE may detect a DL SA with a CCE aggregation level (AL) that is different than the actual one used by a NodeB. Then, if the CCE with the lowest index for the AL a UE detects a DL SA is different than the one used by the NodeB to transmit the DL SA, the UE will incorrectly determine a PUCCH resource for a respective HARQ-ACK signal transmission. This can lead to an HARQ-ACK signal from a UE to be missed by the NodeB or to collide with an HARQ-ACK signal from another UE. This is referred to be PUCCH resource mapping ambiguity issue.

In the legacy LTE system, for CCE ALs $L \in \{1, 2, 4, 8\}$, the CCEs corresponding to PDCCH candidate m are given by:
CCEs for PDCCH candidate $$m=L \cdot \{(Y_k+m') \bmod \lfloor N_{CCE,k}/L \rfloor\}+i$$

where $N_{CCE,k}$ is the total number of CCEs in subframe k, $i=0, \ldots, L-1$, $m'=m+M^{(L)} \cdot n_{CI}$, $n_{CI}$ is a parameter identifying an intended cell for the PDCCH with $n_{CI}=0$ in case of same-cell scheduling, $m=0, \ldots, M^{(L)}-1$, and $M^{(L)}$ the number of PDCCH candidates to monitor in the search space. Exemplary values of $M^{(L)}$ for $L \in \{1, 2, 4, 8\}$ are, respectively, $\{6, 6, 2, 2\}$. For the UE-CSS, $Y_k=0$. For the UE-DSS, $Y_k=(A \cdot Y_{k-1}) \bmod D$ where $Y_{-1}=\text{RNTI} \neq 0$, A=39827 and D=65537.

Referring to FIG. 13, over a total of eight ECCEs 410, there is a maximum of eight PDCCH candidates indexed from 1 to 8 for AL of one ECCE, four PDCCH candidates indexed from 9 to 12 for AL of two ECCEs, two PDCCH candidates indexed from 13-14 for AL of four ECCEs, and one PDCCH candidate indexed as 15 for AL of eight ECCEs. A UE derives a same PUCCH resource for an HARQ-ACK signal transmission if it detects any of PDCCH candidates 1, 9, 13, or 15 since the CCE with lowest index is the same for all these candidates (CCE1). However, PDCCH candidate 2, a UE determines a different PUCCH resource since the CCE with the lowest index is different (CCE2). Therefore, for example, if a PDCCH is actually transmitted using PDCCH candidate 9 (CCE1 and CCE2) and a UE detects a PDCCH for PDCCH candidate 2 (CCE2), there will be a misunderstanding between the NodeB and the UE in the PUCCH resource used to transmit the respective HARQ-ACK signal as the NodeB expects one associated with CCE1 and the UE uses one associated with CCE2. Such error events can typically occur for all combinations among CCE ALs with candidate PDCCHs and the actual CCE AL used to transmit a PDCCH.

Ambiguity of a CCE AL due to the circular rate matching buffer for a tail-biting convolutional code with rate 1/3 occurs when $$N=(2/3)qN_{RE}^{CCE}/k \quad (3)$$

where N is an ambiguous payload size for a DCI format (including the CRC bits), q is the number of CCEs, k is the starting point of repetitions of the coded block, and $N_{RE}^{CCE}$ is the number of REs per CCE. For PDCCH operation, there is a fixed number of $N_{RE}^{CCE}=36$ REs per CCE available for transmitting PDCCH and a number of ambiguous payload sizes can be determined by setting $N_{RE}^{CCE}$ to 36 in Equation (3). For example, for $N_{RE}^{CCE}=36$, ambiguous payload sizes are $\{28, 30, 32, 36, 40, 42, 48, 60, 72\}$.

Several mechanisms are available to resolve the CCE AL ambiguity problem including implementation based, scrambling based, and signaling based ones. For a UE-based implementation mechanism, the actual CCE AL may be decided considering likelihood metrics for detected PDCCH candidates and selecting one with the largest metric. However, this cannot fully solve the CCE AL ambiguity and complicates implementation and testing for a UE. For a NodeB-based implementation mechanism, multiple PUCCH resources may be monitored for HARQ-ACK signal transmission. However, this cannot avoid HARQ-ACK signal collisions, complicates eNodeB implementation, and degrades HARQ-ACK detection reliability as the eNodeB needs to consider multiple hypotheses corresponding to multiple PUCCH resources.

For scrambling based mechanisms, the CRC of a DCI format may additionally be scrambled, as in FIG. 10, with a mask depending on the CCE AL. However, this effectively reduces a CRC length by 2 bits (assuming CRC masking for 4 CCE ALs) which is undesirable. Alternatively, a PDCCH may be scrambled with a different sequence depending on the CCE AL. This is effectively the same as scrambling a CRC and, for the same reason, it is also undesirable.

For signaling based mechanisms, one alternative is for DCI formats of DL SAs to include 2 bits to indicate the CCE AL. However, this increases the DCI format payload which is also unnecessary for most DCI format payloads. Another alternative is to add a dummy bit, for example with a value of 0, to the DCI format information bits whenever it satisfies Equation (3). This alternative is the least disadvantageous and resolves the CCE AL ambiguity issue for PDCCH.

The following exemplary embodiments on PUCCH resource indexing resolve the ambiguity issue without introducing any serious issues.

In one exemplary embodiment (embodiment A), a PUCCH resource index (PUCCH format 1a/1b) associated with an ePDCCH PRB set is at least partly determined by $X_{k,m}$ and N'. Here, $N'=N_{PUCCH-UE-ePDCCH}^{(1)}$, which is UE-specifically RRC configured for the ePDCCH PRB set, and $X_{k,m}$ is the eCCE number indicated by the random variable $X_{k,m}$ as shown in FIG. 9.

In one method, $X_{k,m}$ replaces $n_{CCE}$ and N' replaces $N_{PUCCH}^{(1)}$ in each of the legacy LTE PUCCH HARQ-ACK resource allocation equations. For example, when a UE is configured with a single serving cell and ePDCCH in an FDD (frame structure type 1) system, the UE will derive the PUCCH index according to the following $$n_{PUCCH}^{(1)}=X_{k,m}+N',$$

The PUCCH resource allocation equations in other cases (e.g., carrier aggregation, TDD, etc.) can also be described according to this embodiment.

Suppose that two UEs receive DL assignments in the same set of eCCEs in the same aggregation level (L=2), for instance, eCCEs 8k+4 and 8k+5. Then, according to the method in this embodiment, they are assigned two different PUCCH resources, as long as the two UEs have different $X_{k,m}$'s, i.e., one UE has $X_{k,m}$=8k+4 and the other UE has $X_{k,m}$=8k+5.

To see the benefit of the method, consider two UEs, UE A and UE B, being assigned with ePDCCH candidates according to the following.

UE A has:
Candidate A0 on eCCE0 with AP 107 (AL=1)
Candidate A1 on eCCE1 with AP 108 (AL=1)
Candidate A2 on eCCEs0&1 with AP 107 (AL=2)—with $X_{k,m}$ pointing the eCCE associated with AP 107 (i.e., eCCE0)

UE B with X pointing the eCCE associated with AP 108 has:
Candidate B0 on eCCE0 with AP 107 (AL=1)
Candidate B1 on eCCE1 with AP 108 (AL=1)
Candidate B2 on eCCEs0&1 with AP 108 (AL=2) with $X_{k,m}$ pointing the eCCE associated with AP 108 (i.e., eCCE1)

The cases with the above example are analyzed below with regards to the PUCCH resource mapping ambiguity issue, with applying the method in the current embodiment.

Case 1: Candidate A0 happens to be decoded even though Candidate A2 was actually transmitted.

There is no ambiguity issue because the same PUCCH resource will be used even with this error as $X_{k,m}$ points eCCE0.

Case 2: Candidate A1 happens to be decoded even though Candidate A2 was actually transmitted.

The probability of this event will be low because AP 108 must be precoded for another UE who has a different channel state (or direction).

Case 3: Candidate B0 happens to be decoded even though Candidate B2 was actually transmitted.

The probability of this event will be low because AP 107 must be precoded for another UE that has a different channel state (or direction).

Case 4: Candidate B1 happens to be decoded even though Candidate B2 was actually transmitted.

There is no ambiguity issue because the same PUCCH resource will be used even with this error as $X_{k,m}$ points eCCE1.

However, if the PUCCH resource is derived from AP of the ePDCCH candidate according to the following equation, which could be one potential competing proposal, $$n_{PUCCH}^{(1)}=n_{leading-eCCE}+(p-107)+N',$$

then there is an ambiguity issue in Case 4 because:
Candidate B1 gives $n_{PUCCH}^{(1)}=1+(108-107)+N'=2+N'$;
Candidate B2 gives $n_{PUCCH}^{(1)}=0+(108-107)+N'=1+N'$
The two candidates result in two different PUCCH HARQ-ACK resources.

In another exemplary embodiment (embodiment B), a PUCCH resource index (PUCCH format 1a/1b) associated with an ePDCCH PRB set is at least partly determined by an additional offset $n_{offset}$ as well as $X_{k,m}$ and N'. Here,
$N'=N_{PUCCH-UE-ePDCCH}^{(1)}$, which is UE-specifically RRC configured for the ePDCCH PRB set;
$X_{k,m}$ in is the eCCE number indicated by the random variable $X_{k,m}$ as shown in FIG. 9;
$n_{offset}$ is an integer dynamically indicated by DL SA.

In one method, DL SA carries a 2-bit field to indicate a value of $n_{offset}$. The four states of the 2-bit field are mapped to {x1, x2, x3, x4} respectively, where x1, x2, x3, x4 are integers. In one example, {x1, x2, x3, x4}={-2, 0, 2, 4}.

In one method, $X_{k,m}$ replaces $n_{CCE}$ and N' replaces $N_{PUCCH}^{(1)}$ in each of the legacy LTE PUCCH HARQ-ACK resource allocation equations. In addition, an integer offset $n_{offset}$ is added to the resource equation. For example, when a UE is configured with a single serving cell and ePDCCH in an FDD (frame structure type 1) system, the UE will derive the PUCCH index according to the following $$n_{PUCCH}^{(1)}=X_{k,m}+N'+n_{offset}$$

The PUCCH resource allocation equations in other cases (e.g., carrier aggregation, TDD, etc.) can also be described according to this embodiment.

ARI is useful to resolve the resource collision issue arising when the system has configured more than one ePDCCH set and the PUCCH resource regions (configured by ePDCCH set specific N') of the more than one ePDCCH sets overlap.

In another exemplary embodiment (embodiment C), the random variable $X_{k,m}$ used for determining the PUCCH resource index $n_{PUCCH}^{(1)}$ in embodiments 1 and 2 can be alternatively written as:

$$X_{k,m} = n_{eCCE} + \Delta,$$

where $n_{eCCE}$ is the smallest (leading) eCCE number of the aggregated eCCEs carrying the DL SA, and $\Delta \in \{0, \ldots, L-1\}$ is a resource offset, where L is the eCCE aggregation level.

In other words, $\Delta \in \{0, \ldots, L-1\}$ is the difference of the two eCCE numbers: one for the leading eCCE ($n_{eCCE}$) and the other ($X_{k,m}$) for the eCCE associated with the assigned AP index. According to the example shown in FIG. 9, $\Delta=0$ when L=1; $\Delta=1$ when L=2 or 4; $\Delta=5$ when L=8.

In one method, $\Delta = X_{k,m} - n_{eCCE} = X_{k,m} - L \cdot \lfloor X_{k,m}/L \rfloor$, where $\Delta$ can be derived after $X_{k,m}$ is derived.

In one method, $\Delta = (C\text{-RNTI}) \mod N$, where $N = \min\{L, N_{eCCEsPerPRB}\}$. In this method, $\Delta$ is UE-specifically determined based upon the UE-ID (i.e., C-RNTI), and the modulo N ensures that $\Delta$ does not exceed L as $N_{eCCEsPerPRB}=2$ or 4. This method can be equivalently written as $\Delta = (C\text{-RNTI}) \mod L \mod N_{eCCEsPerPRB}$ or $\Delta = (C\text{-RNTI}) \mod N_{eCCEsPerPRB} \mod L$.

In one method, $\Delta = Y_k \mod N$ (or equivalently $\Delta = Y_k \mod L \mod N_{eCCEsPerPRB}$ or $\Delta = Y_k \mod N_{eCCEsPerPRB} \mod L$). This is another way to randomize $\Delta$ based upon the UE-ID (or C-RNTI).

According to the method in embodiment A and this alternative representation of $X_{k,m}$, in an example case when a UE is configured with a single serving cell and ePDCCH in an FDD (frame structure type 1) system, the UE will derive the PUCCH index according to the following $$n_{PUCCH}^{(1)} = n_{eCCE} + \Delta + N'.$$

According to the method in embodiment B and this alternative representation of $X_{k,m}$, in an example case when a UE is configured with a single serving cell and ePDCCH in an FDD (frame structure type 1) system, the UE will derive the PUCCH index according to the following:

$$n_{PUCCH}^{(1)} = n_{eCCE} + \Delta + N' + n_{offset}.$$

In another embodiment (embodiment D), a minimum aggregation level Lmin in each DL subframe where ePDCCHs are transmitted, can be determined based upon the available number of resource elements for ePDCCH mapping.

For the efficient utilization of PUCCH resources, the PUCCH resource allocation equation changes dependent upon the minimum aggregation level Lmin. In one example, In case Lmin=1, the PUCCH resource allocation equations in embodiments 1, 2 and 3 is reused.

In case Lmin=2, the PUCCH resource allocation equations in embodiments 1, 2 and 3 is reused, with replacing $X_{k,m}$ with one of the following alternative numbers.

Alt 1:

$$\lfloor X_{k,m}/2 \rfloor = \left\lfloor \frac{n_{eCCE} + \Delta}{2} \right\rfloor.$$

Alt 2:

$$\left\lfloor \frac{n_{eCCE}}{2} \right\rfloor + \left\lfloor \frac{\Delta}{2} \right\rfloor.$$

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for exchanging control information in a communication system, comprising:
   receiving downlink control information on an Enhanced Physical Downlink Control Channel (EPDCCH) comprising at least one Enhanced Control Channel Elements (ECCE);
   identifying a first resource for uplink control information based on the first ECCE of the at least one ECCE, a resource offset configured for the EPDCCH, and ACK/NACK resource offset on the EPDCCH, if the EPDCCH is distributed transmission;
   identifying a second resource for uplink control information based on the first ECCE of the at least one ECCE, a resource offset configured for the EPDCCH, ACK/NACK resource offset on the EPDCCH and C-RNTI, if the EPDCCH is localized transmission; and
   transmitting the uplink control information on the first resource or the second resource ac cording to whether the EPDCCH is distributed transmission or localized transmission.

2. The method as set forth in claim 1, wherein the ACK/NACK resource offset comprises two bits configured to indicate one of: 0, 1, −1, and −2.

3. The method as set forth in claim 1, wherein the second resource is determined based on a total number of eCCEs per physical resource block (PRB).

4. The method as set forth in claim 1, wherein the uplink control information is a hybrid automatic repeat request-acknowledgement (HARQ-ACK) information corresponding to the EPDCCH.

5. The method as set forth in claim 1 wherein, when the downlink control information is received on a PDCCH, identifying a third resource for uplink control information based on the first CCE of the at least one CCE and a resource offset configured for the PDCCH.

6. An apparatus for transmitting control information in a communication system, comprising:
   a transceiver configured to:
     receive downlink control information on an Enhanced Physical Uplink Control Channel (EPDCCH) comprising at least one Enhanced CCEs (ECCE), and
     transmit uplink control information on a first resource or a second resource according to whether the EPDCCH is distributed transmission or localized transmission; and
   a controller configured to:
     identify the first resource for uplink control information based on the first ECCE of the at least one ECCE, a resource offset configured for the EPDCCH, and ACK/NACK resource offset on the EPDCCH, if the EPDCCH is distributed transmission, and
     identify the second resource for uplink control information based on the first ECCE of the at least one ECCE, a resource offset configured for the EPDCCH, ACK/NACK resource offset on the EPDCCH, and C-RNTI, if the EPDCCH is localized transmission.

7. The apparatus as set forth in claim 6, wherein the ACK/NACK resource offset comprises two bits configured to indicate one of: 0, 1, −1, and −2.

8. The apparatus as set forth in claim 6, wherein the second resource is determined based on a total number of eCCEs per physical resource block (PRB).

9. The apparatus as set forth in claim 6, wherein the uplink control information is a hybrid automatic repeat request-acknowledgement (HARQ-ACK) information corresponding to the EPDCCH.

10. The apparatus as set forth in claim 6, wherein, when the downlink control information is received on a PDCCH, identifying a third resource for uplink control information based on the first CCE of the at least one CCE and a resource offset configured for the PDCCH.

11. A method for exchanging control information in a communication system, comprising:
transmitting downlink control information on an Enhanced Physical Downlink Control Channel (EPDCCH) comprising at least one Enhanced Control Channel Elements (ECCE);
indicating a first resource for uplink control information as a function of the first ECCE of the at least one ECCE, a resource offset configured for the EPDCCH, and ACK/NACK resource offset on the EPDCCH, if the EPDCCH is distributed transmission;
indicating a second resource for uplink control information as a function of the first ECCE of the at least one ECCE, a resource offset configured for the EPDCCH, ACK/NACK resource offset on the EPDCCH and C-RNTI, if the EPDCCH is localized transmission; and
receiving the uplink control information on the first resource or the second resource according to whether the EPDCCH is distributed transmission or localized transmission.

12. The method as set forth in claim 11, wherein the ACK/NACK resource offset comprises two bits configured to indicate one of: 0, 1, −1, and −2.

13. The method as set forth in claim 11, wherein the second resource is indicated as a function of a total number of eCCEs per physical resource block (PRB).

14. The method as set forth in claim 11, wherein the uplink control information is a hybrid automatic repeat request-acknowledgement (HARQ-ACK) information corresponding to the EPDCCH.

15. The method as set forth in claim 11, further comprising, when the downlink control information is transmitted on a PDCCH, indicating a third resource for uplink control information based on the first CCE of the at least one CCE and a resource offset configured for the PDCCH.

16. An apparatus for transmitting control information in a communication system, comprising:
a transceiver configured to:
transmit downlink control information on an Enhanced Physical Uplink Control Channel (EPDCCH) comprising at least one Enhanced CCEs (ECCE), and
receive uplink control information on a first resource or a second resource according to whether the EPDCCH is distributed transmission or localized transmission; and
a controller configured to:
indicate the first resource for uplink control information as a function of the first ECCE of the at least one ECCE, a resource offset configured for the EPDCCH, and ACK/NACK resource offset on the EPDCCH, if the EPDCCH is distributed transmission, and
indicate the second resource for uplink control information as a function of the first ECCE of the at least one ECCE, a resource offset configured for the EPDCCH, ACK/NACK resource offset on the EPDCCH, and C-RNTI, if the EPDCCH is localized transmission.

17. The apparatus as set forth in claim 16, wherein the ACK/NACK resource offset comprises two bits configured to indicate one of: 0, 1, −1, and −2.

18. The apparatus as set forth in claim 16, wherein the second resource is indicated as a function of a total number of eCCEs per physical resource block (PRB).

19. The apparatus as set forth in claim 16, wherein the uplink control information is a hybrid automatic repeat request-acknowledgement (HARQ-ACK) information corresponding to the EPDCCH.

20. The apparatus as set forth in claim 16, wherein, when the downlink control information is received on a PDCCH, the controller configured to indicate a third resource for uplink control information based on the first CCE of the at least one CCE and a resource offset configured for the PDCCH.

* * * * *